US009467253B2

(12) United States Patent
Mahdavifar et al.

(10) Patent No.: US 9,467,253 B2
(45) Date of Patent: Oct. 11, 2016

(54) COMPUTING SYSTEM WITH COORDINATED MULTIPLE-ACCESS MECHANISM AND METHOD OF OPERATION THEREOF

(71) Applicant: Samsung Electronics Co., Ltd., Suwon-si, Gyeonggi-Do (KR)

(72) Inventors: Hessam Mahdavifar, San Diego, CA (US); Mostafa El-Khamy, San Diego, CA (US); Jungwon Lee, San Diego, CA (US); Inyup Kang, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/327,450

(22) Filed: Jul. 9, 2014

(65) Prior Publication Data

US 2015/0016563 A1    Jan. 15, 2015

Related U.S. Application Data

(60) Provisional application No. 61/844,134, filed on Jul. 9, 2013.

(51) Int. Cl.
*H04W 24/00* (2009.01)
*H04L 1/00* (2006.01)
(Continued)

(52) U.S. Cl.
CPC ........... *H04L 1/0075* (2013.01); *H04B 7/0697* (2013.01); *H04L 5/0037* (2013.01); *H04L 5/0064* (2013.01); *H04B 7/024* (2013.01)

(58) Field of Classification Search
CPC ... H04L 1/0038; H04B 7/024; H04B 7/0456; H04B 7/0452; H04W 72/042; H04W 72/04
See application file for complete search history.

(56) References Cited

U.S. PATENT DOCUMENTS

| 9,083,387 B2 * | 7/2015 | Mahdavifar et al. |
| 2006/0072655 A1 * | 4/2006 | Lin ...................... H04B 1/7097 375/148 |

(Continued)

OTHER PUBLICATIONS

"Channel polarization: A method for constructing capacity-achieving codes for symmetric binary-input memoryless channels", Erdal Arikan, IEEE Transactions on Information Theory, vol. 55, No. 7, pp. 3051-3073, Jul. 2009.

(Continued)

*Primary Examiner* — Dac Ha
(74) *Attorney, Agent, or Firm* — IP Investment Law Group

(57) ABSTRACT

A computing system includes: an interface configured to communicate a coordination profile for coordinating a second transmitter device with a first transmitter device; and a unit, coupled to the interface, configured to generate a first encoded message using a message polarization mechanism based on the coordination profile for coordinating the first encoded message with a second encoded message concurrently transmitting through the second transmitter device.
A further embodiment of the computing system includes: an interface configured to communicate a receiver signal for representing a first encoded message and a second encoded message coordinated for concurrent transmission; a unit, coupled to the interface, configured to: determine a communication rate associated with the receiver signal, and decode the receiver signal based on a message polarization mechanism and the communication rate for identifying the first encoded message based on a coordination profile corresponding to the communication rate.

18 Claims, 5 Drawing Sheets

(51) Int. Cl.
*H04B 7/06* (2006.01)
*H04L 5/00* (2006.01)
*H04B 7/02* (2006.01)

(56) References Cited

U.S. PATENT DOCUMENTS

| | | | |
|---|---|---|---|
| 2008/0075333 A1* | 3/2008 | Ericson et al. | 382/116 |
| 2010/0040006 A1* | 2/2010 | Caire | 370/329 |
| 2010/0309847 A1* | 12/2010 | Bharadwaj | H04W 48/18 370/328 |
| 2011/0207487 A1* | 8/2011 | Yang et al. | 455/507 |
| 2012/0122463 A1* | 5/2012 | Chen et al. | 455/450 |
| 2013/0028128 A1* | 1/2013 | Novak | H04B 17/0077 370/252 |
| 2013/0339507 A1* | 12/2013 | Wiley | 709/223 |
| 2014/0169492 A1 | 6/2014 | Mahdavifar et al. | |

OTHER PUBLICATIONS

"Polar codes for the two-user binary-input multiple-access channels", E. Sasoglu, E.Telatar, and Edmund Yeh, Proceedings of 2010 Information Theory Workshop (ITW), pp. 1-5, Dublin, Ireland, 2010.

"Polar codes for the m-user multiple access channel", E. Abbe, E. Telatar, IEEE Transactions on Information Theory, vol. 58, No. 8, pp. 5437-5448, Aug. 2012.

"Constructing Polar Codes for Non-Binary Alphabets and MACs", I.Tal, A.Sharov, and A.Vardy, 2012 IEEE International Symposium on Information Theory (ISIT) Proceedings, pp. 2132-2136, Cambridge, MA, 2012.

"MAC Polar Codes and Matroids", E. Abbe, and E. Telatar, Information Theory and Applications (ITA) Workshop, pp. 1-8, San Diego, CA, 2010.

"Polar Alignment for Interference Networks", K.Appaiah, O.Koyluoglu, and S.Vishwanath, 2011 49th Annual Allerton Converence on Communication, Control, and Computing, pp. 240-246, Monticello, IL, 2011.

* cited by examiner

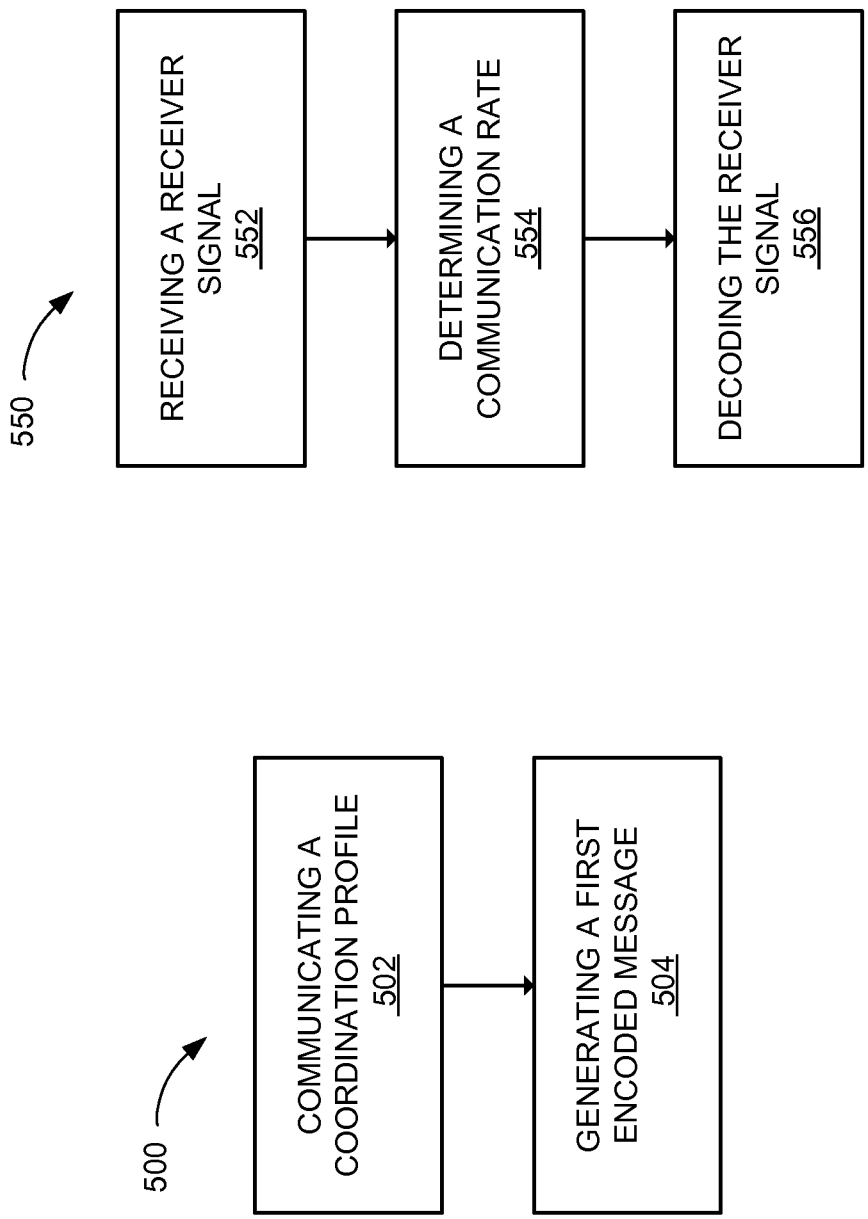

COMPUTING SYSTEM WITH COORDINATED MULTIPLE-ACCESS MECHANISM AND METHOD OF OPERATION THEREOF

CROSS-REFERENCE TO RELATED APPLICATION(S)

This application claims the benefit of U.S. Provisional Patent Application Ser. No. 61/844,134 filed Jul. 9, 2013, and the subject matter thereof is incorporated herein by reference thereto.

TECHNICAL FIELD

An embodiment of the present invention relates generally to a computing system, and more particularly to a system with coordinated multiple-access mechanism.

BACKGROUND

Modern consumer and industrial electronics, especially devices such as cellular phones, navigations systems, portable digital assistants, and combination devices, are providing increasing levels of functionality to support modern life including mobile communication. Research and development in the existing technologies can take a myriad of different directions.

The increasing demand for information in modern life requires users to access information at any time, at increasing data rates. However, telecommunication signals used in mobile communication effectively experience various types of hindrances from numerous sources, as well as computational complexities rising from numerous possible formats for communicated information, which affect the quality and speed of the accessible data.

Thus, a need still remains for a computing system with coordinated multiple-access mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a computing system, including: an inter-device interface configured to communicate a coordination profile based on a coordination mechanism for coordinating a second transmitter device with a first transmitter device communicating the content configuration; and a communication unit, coupled to the inter-device interface, configured to generate a first encoded message using a message polarization mechanism based on the coordination profile for coordinating the first encoded message with a second encoded message for concurrent transmission through the second transmitter device.

An embodiment of the present invention provides a method of operation of a computing system including: communicating a coordination profile based on a coordination mechanism for coordinating a second transmitter device with a first transmitter device communicating the content configuration; and generating a first encoded message with a communication unit using a message polarization mechanism based on the coordination profile for coordinating the first encoded message with a second encoded message for concurrent transmission through the second transmitter device.

An embodiment of the present invention provides a computing system, including: an inter-device interface configured to communicate a receiver signal for representing a first encoded message and a second encoded message coordinated for concurrently transmitting with the first encoded message; a communication unit, coupled to the inter-device interface, configured to: determine a communication rate associated with the receiver signal, and decode the receiver signal based on a message polarization mechanism and the communication rate for identifying the first encoded message intended for communication based on a coordination profile corresponding to the communication rate.

An embodiment of the present invention provides a method of operation of a computing system including: receiving a receiver signal for representing a first encoded message and a second encoded message coordinated for concurrently transmitting with the first encoded message; determining a communication rate associated with the receiver signal; and decoding the receiver signal with a communication unit based on a message polarization mechanism and the communication rate for identifying the first encoded message intended for communication based on a coordination profile corresponding to the communication rate.

Certain embodiments of the invention have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

FIG. 5 is a flow chart of a method of operation of a computing system in a further embodiment of the present invention.

DETAILED DESCRIPTION

Figure 1:
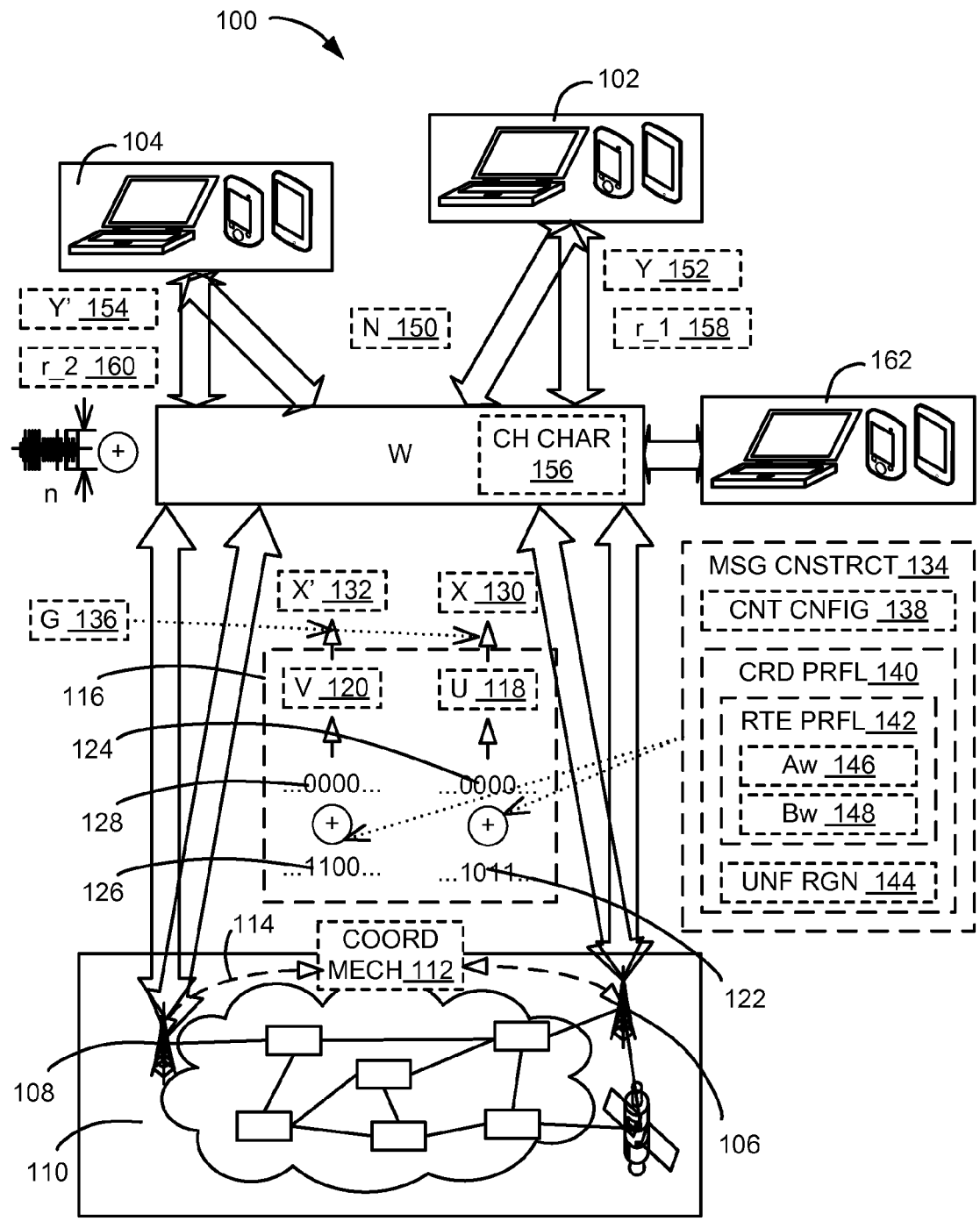
FIG. 1 is a computing system with coordinated multiple-access mechanism in an embodiment of the present invention.

The following embodiments of the present invention can be used to coordinate multiple communications over multiple access channels. A coordination mechanism communicating coordination profile between multiple transmitter devices can be used to construct messages according to a message construction mechanism. The constructed messages can be transmitted according to a message polarization mechanism common across multiple transmitters.

The transmitted encoded messages can be received. Based on attributes of the received signal, such as communication rate or mutual information, receiving devices can calculate a decoding sequence. The receiving device can further decode the received signals according to the decoding sequence to estimate or recover the originally intended content.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof.

The term "processing" as used herein includes manipulating signal and corresponding data, such as filtering, detecting, decoding, assembling data structures, transferring data structures, manipulating data structures, and reading and writing data structures. Data structures are defined to be information arranged as symbols, packets, blocks, files, input data, system generated data, such as calculated or generated data, and program data.

Referring now to FIG. 1, therein is shown a computing system 100 with coordinated multiple-access mechanism in an embodiment of the present invention. The computing system 100 includes a first receiver device 102, a second receiver device 104, a first transmitter device 106, a second transmitter device 108, or a combination thereof.

The first receiver device 102, the second receiver device 104, the first transmitter device 106, the second transmitter device 108, or a combination thereof can include a personal device, a mobile device, a communication device, an access point device, or a combination thereof. The first receiver device 102, the second receiver device 104, the first transmitter device 106, the second transmitter device 108, or a combination thereof can be connected to a network 110.

The network 110 can be a system of wired or wireless communication devices or means that are connected to each other for enabling communication between devices. For example, the network 110 can include a combination of wires, transmitters, receivers, antennas, towers, stations, repeaters, telephone network, servers, or client devices for a wireless cellular network. The network 110 can also include a combination of routers, cables, computers, servers, and client devices for various sized area networks.

The first receiver device 102, the second receiver device 104, the first transmitter device 106, the second transmitter device 108, or a combination thereof can include a cellular phone, a notebook computer, a wearable device, a base station, a router, or a combination thereof. The first receiver device 102, the second receiver device 104, the first transmitter device 106, the second transmitter device 108, or a combination thereof can directly or indirectly link and communicate with each other, the network 110, or a combination thereof. The network 110 can include the first receiver device 102, the second receiver device 104, the first transmitter device 106, the second transmitter device 108, or a combination thereof.

For example, the first receiver device 102, the second receiver device 104, the first transmitter device 106, the second transmitter device 108, or a combination thereof can include a personal mobile device transmitting or receiving a signal. Also for example, the first receiver device 102, the second receiver device 104, the first transmitter device 106, the second transmitter device 108, or a combination thereof can include a base station transmitting or receiving a signal.

As a more specific example, the first receiver device 102, the second receiver device 104, the first transmitter device 106, the second transmitter device 108, or a combination thereof can exchange information between personal mobile devices, between personal mobile device and mobile station, or a combination thereof. Also as a more specific example, the first receiver device 102, the second receiver device 104, the first transmitter device 106, the second transmitter device 108, or a combination thereof can include devices other than personal mobile devices or base stations, such as a server, a stationary computing device, a switch or a router, a device acting as a hotspot or tethered to another device, a portion or a segment therein, or a combination thereof.

For illustrative purposes, the first receiver device 102 and the second receiver device 104 will be described as mobile user devices and the first transmitter device 106 and the second transmitter device 108 will be described as base stations. However, it is understood that the computing system 100 can be different. For example, the first receiver device 102, the second receiver device 104, the first transmitter device 106, the second transmitter device 108, or a combination thereof receiving signals can be stationary, such as for a router or gateway, or mobile. Also for example, any one or more of the first receiver device 102, the second receiver device 104, the first transmitter device 106, the second transmitter device 108, or a combination thereof can be the base station, the user device, the access point for the network 110, or a combination thereof as described above.

For further illustrative purposes, the first receiver device 102 and the second receiver device 104 will be described as mobile user devices receiving signals transmitted from the first transmitter device 106 and the second transmitter device 108. However, it is understood that the roles or perspectives can change. For example, the mobile user devices can also transmit signals to the base stations to become the first transmitter device 106 and the second transmitter device 108 transmitting to the base station.

For further illustrative purposes, the first transmitter device 106 and the second transmitter device 108 will be arbitrarily described as intending to communicate with the first receiver device 102. However, it is understood that any one or more of the devices in the computing system 100 can communicate with any other one or more of the devices.

For further illustrative purposes, the first receiver device 102, the second receiver device 104, the first transmitter device 106, and the second transmitter device 108 will be described as using wireless communications. However, it is understood that the first receiver device 102, the second receiver device 104, the first transmitter device 106 and the second transmitter device 108 can communicate using wire connections, such as for cable modems or optical fiber, using dedicated connections or shared medium, or a combination thereof.

The network 110 can include the first receiver device 102, the second receiver device 104, the first transmitter device 106, the second transmitter device 108, or a combination thereof. The network 110 can include the first receiver device 102, the second receiver device 104, the first transmitter device 106, the second transmitter device 108, or a combination thereof as access points, end point devices, intermediate devices relaying signals, or a combination thereof.

The first receiver device 102, the second receiver device 104, the first transmitter device 106, the second transmitter device 108, or a combination thereof can further communicate indirectly with each other. For example, the first receiver device 102, the second receiver device 104, the first transmitter device 106, the second transmitter device 108, or a combination thereof can communicate signals using the network 110 and other components therein.

The first receiver device 102, the second receiver device 104, the first transmitter device 106, the second transmitter device 108, or a combination thereof can communicate directly with each other. For example, the first receiver device 102, the second receiver device 104, the first transmitter device 106, the second transmitter device 108, or a combination thereof can communicate based on Bluetooth™ or Wireless Fidelity (WiFi) or other wireless communication method.

Based on the communication method, such as code division multiple access (CDMA), orthogonal frequency-division multiple access (OFDMA), Third Generation Partnership Project (3GPP), Long Term Evolution (LTE), or fourth generation (4G) standards, the communication signals can include a reference portion, a header portion, a format portion, an error correction or detection portion, or a combination thereof imbedded in the communicated information. The reference portion, header portion, format portion, error correction or detection portion, or a combination thereof can include a predetermined bit, pulse, wave, symbol, or a combination thereof. The various portions can be embedded within the communicated signals at regular time intervals, frequency, code, or a combination thereof.

The computing system 100 can include a coordination mechanism 112 for communicating multiple independent messages. The coordination mechanism 112 is a method or a process for organizing or arranging multiple independent communications. The coordination mechanism 112 can include communicating and sharing information between transmitting devices, such as between the first transmitter device 106 and the second transmitter device 108.

The coordination mechanism 112 can further include coordination of content, a construction process, an encoding process, a modulation process, a transmission process, or a combination thereof for multiple independent messages intended for communication. For example, the coordination mechanism 112 can coordinate additional information, sequence or arrangement of information, or a combination thereof for the content and construction, encode the independent messages together using a combined or singular polar encoding process, or a combination thereof.

The computing system 100 can use a coordination link 114 to implement or utilize the coordination mechanism 112. The coordination link 114 can include a method, a process, or a mechanism for directly communicating information between transmitting devices.

For example, the coordination link 114 can include the method, the process, or the mechanism for directly communicating between node devices or access points, such as the first transmitter device 106 and the second transmitter device 108, between end-user devices transmitting information, between an end-user device and the node device, or a combination thereof. As a more specific example, the coordination link 114 can include a back channel or a device coordinating, controlling, or managing a collection of the transmitting devices. Also as a more specific example, the coordination link 114 can include a wireless connection, a wired connection, intermediate devices, coordinating device, or a combination thereof.

The computing system 100 can use the coordination mechanism 112 to coordinate communication for a message set 116. The message set 116 can include a collection or a grouping of independent messages or content material controlled by or accessible by the computing system 100 or by one or more devices therein.

The message set 116 can include a first message 118 and a second message 120 for respectively communicating between the first receiver device 102 and the first transmitter device 106, and between the second receiver device 104 and the second transmitter device 108. The first message 118 can be one instance of the independent message. The first message 118 can be the content information intended for communication and reproduction for a recipient user at an intended receiving device. The first message 118 can be the content information corresponding to communication between the first transmitter device 106 and the first receiver device 102.

The second message 120 can be an instance of the independent message different from the first message 118. The second message 120 can be the content information intended for communication and reproduction of information different from the first message 118. The second message 120 can be the content intended for the same user or device as the first message 118, or for a different recipient user through a different receiving device.

The second message 120 can be the content information corresponding to communication between the second transmitter device 108 and the first receiver device 102, or between the second transmitter device 108 and the second receiver device 104. The second message 120 can further be the content information corresponding to communication between the first transmitter device 106, the second transmitter device 108, or a combination thereof and the first receiver device 102 for a process, a thread, an application, a segment or a portion, or a purpose different from that of the first message 118.

The first message 118 and the second message 120 can each include a content portion and a format portion for communication. For example, the first message 118 can include first content data 122, first format data 124, or a combination thereof. Also for example, the second message 120 can include second content data 126, second format data 128, or a combination thereof.

The content portion, such as the first content data 122 or the second content data 126, is information intended for execution at a receiving device. The content portion can include the intended sound, operation, image, instruction, process, or a combination thereof to be performed or executed at the receiving device.

The format portion, such as the first format data 124 and the second format data 128, is information intended for communicating the content portion. For example, the format portion can include one or more bits frozen to zero for communicating the content portion over one or more bit channels. Also for example, the format portion can include information regarding error checking or correction process, header information, a type or a category for the communication, a description regarding the content portion, or a combination thereof.

The computing system 100 can use the first transmitter device 106, the second transmitter device 108, or a combination thereof to generate a first encoded message 130, a second encoded message 132, or a combination thereof for communicating with the first receiver device 102, the second receiver device 104, or a combination thereof.

The first encoded message 130 is information processed for transmission according to a process or a method predetermined by the computing system 100. The first encoded message 130 can be based on processing the first message 118. The first encoded message 130 can be based on rearranging the first message 118, including or adding specific information to the first message 118, separating the first message 118 into multiple groupings, or a combination thereof.

The second encoded message 132 is information processed for transmission according to a process or a method predetermined by the computing system 100 and independent of the first encoded message 130. The second encoded message 132 can be based on processing the second message 120. The second encoded message 132 can be based on rearranging the second message 120, including or adding specific information to the second message 120, separating the second message 120 into multiple groupings, or a combination thereof.

The computing system 100 can use a message construction mechanism 134, a message polarization mechanism 136, or a combination thereof to generate the first encoded message 130, the second encoded message 132, or a combination thereof. The message construction mechanism 134 is a process or a method for processing the intended content data for transmission. The message construction mechanism 134 can be the process or the method for generating the format data, arranging the content data and the format data, or a combination thereof.

For example, the computing system 100 can use the message construction mechanism 134 to generate the first format data 124, the second format data 128, or a combination thereof. The computing system 100 can use the message construction mechanism 134 to generate the first format data 124 based on the first content data 122, the second format data 128 based on the second content data 126, or a combination thereof.

Also for example, the computing system 100 can use the message construction mechanism 134 to generate a sequence for the content and the format information in the first message 118, the second message 120, or a combination thereof according to a content configuration 138. The content configuration 138 is a description, a representation, a requirement, or a combination thereof of a sequence or an abstract location of the content data and the format data included in the message. The content configuration 138 can represent or describe a specific sequence or locations of the first content data 122 and the first format data 124 in the first message 118, the second content data 126 and the second format data 128 in the second message 120, or a combination thereof.

The message construction mechanism 134 can be associated with a coordination profile 140. The coordination profile 140 is information representing coordination between multiple transmission devices. The coordination profile 140 can include information shared and utilized for coordinating transmission between the multiple devices. The coordination profile 140 can further include information describing capacity, characteristics, limitations, channel, rate, or a combination thereof unique to or likely resulting for communication between intended devices.

For example, the coordination profile 140 can include the content configuration 138. As a more specific example, the first transmitter device 106 can communicate the content configuration 138 for the first message 118 with the second transmitter device 108. Also as a more specific example, the second transmitter device 108 can communicate the content configuration 138 for the second message 120 with the first transmitter device 106.

Also for example, the coordination profile 140 can include a rate profile 142, a uniform rate region 144, or a combination thereof. The rate profile 142 is a description of achievable or existing rates for multiple coordinated transmissions. The achievable rates for multiple transmissions can be combined using the compound polar coding scheme. It has been discovered that the rate profile 142 combining the achievable rates for multiple transmissions provide improved polarization rate for further points on the uniform rate region 144.

For example, the rate profile 142 can describe communication rates for the first transmitter device 106, the second transmitter device 108, or a combination thereof. The rate profile 142 can describe an interaction between communication rates for the first transmitter device 106 and the second transmitter device 108 based on the coordination mechanism 112, the message construction mechanism 134, the message polarization mechanism 136, or a combination thereof.

Also for example, the rate profile 142 can include a first rate set 146, a second rate set 148, or a combination thereof. The first rate set 146 can be a combination of communication rates for multiple transmissions maintaining maximum instances of the communication rate of the first transmitter device 106, the first encoded message 130, a portion therein, or a combination thereof, and optimizing all other communication rates. For example, the first rate set 146 can include the maximum communication rate of the first transmitter device 106 and other maximum allowable communication rates for other devices while maintaining the maximum communication rate of the first transmitter device 106. The first rate set 146 can be represented as '$A_W$'.

The second rate set 148 can be a combination of communication rates for multiple transmissions maintaining maximum instances of the communication rate of the second transmitter device 108, the second encoded message 132, a portion therein, or a combination thereof and optimizing all other communication rates. For example, the second rate set 148 can include highest instances of communication rates for transmitters other than the second transmitter device 108 while maintaining the maximum communication rate of the second transmitter device 108. The second rate set 148 can be represented as '$B_W$'.

As a more specific example, the first rate set 146 can be for a condition of maximizing the communication rate for the first encoded message 130 and maximum allowed communication rate for the second encoded message 132 not affecting the communication rate for the first encoded message 130. Also as a more specific example, the second rate set 148 can be for a condition of maximizing the communication rate for the second encoded message 132 and maximum allowed communication rate for the first encoded message 130 not reducing the communication rate for the second encoded message 132.

The uniform rate region 144 is a description of interaction between multiple communication rates where the communication rate for one message affects the communication rate for one or more other devices. The uniform rate region 144 can be an m-dimensional polyhedran in the m-dimensional space, with 'm' corresponding to a total number of coordinated devices. For the uniform rate region 144, the input distributions of the first encoded message 130 and the second encoded message 132 are assumed to be independent and uniform. The uniform rate region 144 can be a planar, including maximum rate set corresponding to the transmitting device, such as the first rate set 146 and the second rate set 148.

The computing system 100 can process the first encoded message 130, the second encoded message 132, or a combination thereof using a coding scheme, such as the message polarization mechanism 136. The message polarization mechanism 136 is a method, a process, or a combination thereof for providing linear block error correcting code. The message polarization mechanism 136 can include a set of codes, an alphabet, a rule set, or a combination thereof corresponding to one or a combination bit values.

The message polarization mechanism 136 can include the method, the process, or the combination thereof for constructing polar based schemes for transmission over MAC channel or MAC-polar codes. The message polarization mechanism 136 can be for implementing channel polarization. Details regarding the message polarization mechanism 136 will be described below.

The computing system 100 can generate the first encoded message 130, the second encoded message 132, or a combination thereof based on the first content data 122, the second content data 126, or a combination thereof. The computing system 100 can generate the first encoded message 130, the second encoded message 132, or a combination thereof based on the first message 118, the second message 120, or a combination thereof processed using the message construction mechanism 134.

The message polarization mechanism 136 can further include a channel polarization parameter. The message polarization mechanism 136 also include application of a Kronecker power for processing or polarizing the first message 118, the second message 120, or a combination thereof to generate the first encoded message 130, the second encoded message 132, or a combination thereof. The message polarization mechanism 136 or a factor used therein can be represented as '$G^{\otimes n}$'. Details regarding the message polarization mechanism 136 will be described below.

The first encoded message 130, the second encoded message 132, or a combination thereof can include a message size 150. The message size 150 can be a quantity, a length, a magnitude, or a combination thereof for the first encoded message 130, the second encoded message 132, or a combination thereof. The message size 150 can be unique for and different between the first encoded message 130 and the second encoded message 132. The message size 150 can also be the same for the first encoded message 130 and the second encoded message 132.

The message size 150 can be controlled by the message polarization mechanism 136, the coordination mechanism 112, a standard, the computing system 100, or a combination thereof. The message size 150 can depend on a quantity, a length, a magnitude, or a combination thereof corresponding to the first message 118, the second message 120, or a combination thereof.

The first message 118 can be represented as 'U' with $U_1^N = (U_1, U_2, \ldots, U_N)'$. The second message 120 can be represented as 'V' with '$V_1^N = (V_1, V_2, \ldots, V_N)$'. The message size 150 can be represented as 'N'. The first encoded message 130 can be represented as '$X_1^N$'. The second encoded message 132 can be represented as '$X'^N_1$'.

The first encoded message 130, the second encoded message 132, or a combination thereof can be based on the message polarization mechanism 136, the message construction mechanism 134, or a combination thereof. For example, the first encoded message 130, the second encoded message 132, or a combination thereof can be based on applying the message polarization mechanism 136 to the first message 118, the second message 120, or a combination thereof resulting from utilizing the message construction mechanism 134 for the first content data 122, the second content data 126, or a combination thereof.

The first encoded message 130 can be further represented as '$X_1^N = U_1^N G^{\otimes n}$'. The second encoded message 132 can be further represented as '$x'^N_1 = V_1^N G^{\otimes n}$'.

The first encoded message 130, the second encoded message 132, or a combination thereof can be transmitted using a modulation scheme. The modulation scheme can utilize symbols to represent the encoded message. For example, the modulation scheme can include quadrature amplitude modulation (QAM), phase-shift keying (PSK), a derivation thereof, or a combination thereof. As a more specific example, the first encoded message 130, the second encoded message 132, or a combination thereof can be transmitted using binary phase shift keying (BPSK).

The transmitted instance of the first encoded message 130, the second encoded message 132, or a combination thereof can be received as a first receiver signal 152, a second receiver signal 154, or a combination thereof. The first receiver signal 152 can be information received by the first receiver device 102. The first receiver signal 152 can include or correspond to the first encoded message 130, the second encoded message 132, a portion therein, or a combination thereof intended for communication with the first receiver device 102 when transmitted by the first transmitter device 106, the second transmitter device 108 or a combination thereof.

The second receiver signal 154 can be information received by the second receiver device 104. The second receiver signal 154 can include or correspond to the first encoded message 130, the second encoded message 132, a portion therein, or a combination thereof intended for communication with the second receiver device 104 when transmitted by the first transmitter device 106, the second transmitter device 108, or a combination thereof.

The first receiver signal 152, the second receiver signal 154, or a combination thereof can include portions corresponding to the first encoded message 130, the second encoded message 132, or a combination thereof. The first receiver signal 152 can be represented as '$Y_1^L$'. The second receiver signal 154 can be represented as '$Y'^L_1$'.

The receiver signal, such as the first receiver signal 152 or the second receiver signal 154, can be different from the transmitted signal, such as the first encoded message 130 or the second encoded message 132. The transmitted signal can be altered from a communication channel, or a polarized instance thereof, directly linking transmitting and receiving devices, such as between the first transmitter device 106, the second transmitter device 108, the first receiver device 102, the second receiver device 104, or a combination thereof.

The communication channel can include repeaters, amplifiers, or a combination thereof there-between for an indirect link. The communication channel can further include a specific instance or value of communication detail, such as frequency, time slot, packet designation, transmission rate, channel code, or a combination thereof used for transmitting signals between intended devices. The communication channel can correspond to physical characteristics unique to geographic locations associated with the corresponding devices.

The communication channel can include effects from structures or influences, such as fading characteristics of signals or causes for unique delay or reflection of signals, affecting the transmission of communication signals. The communication channel can distort or alter the signals traversing therein. The communication channel, or the polarized instance thereof, can be represented as 'W'.

The communication channel can include an m-user binary-input multiple access channels (MAC). The MAC channel can include multiple transmitters communicating with one or more intended receiver.

The communication channel can include the encoded message, such as the first encoded message 130 or the second encoded message 132, as input and receiver signal, such as the first receiver signal 152 or the second receiver signal 154, as the output. The communication channel can correspond to characteristics including binary-input, memory-less, symmetric capacity, discrete, additive Gaussian modeled, or a combination thereof.

The computing system 100 can describe or represent changes or effects of the communication channel on the traversing signals by calculating a channel characterization 156. The channel characterization 156 can describe or represent the difference between the input and corresponding output of the communication channel. The channel characterization 156 can represent or characterize fading, distortions or alterations from delayed signals or echoes, or a combination thereof of the communication channel.

For example, the channel characterization 156 can include a matrix with a set of values representing changes to originally transmitted signal, observed at the receiving device after traversing the communication channel. Also for example, the channel characterization 156 can further include a channel quality indicator (CQI). Also for example, the channel characterization 156 can be associated with the rate profile 142.

The computing system 100 can communicate the messages between devices at the communication rate, such as a first rate 158 or a second rate 160. The first rate 158 can be represented as '$R_1$'. The second rate can be represented as '$R_2$'.

The communication rate can be associated with devices intending to communicate and exchange information therebetween. The communication rate can be affected by signals from transmitting devices intending to communicate with a device other than the receiving device.

For example, the first rate 158 can be the communication rate corresponding to the first message 118 or a derivation thereof. The first rate 158 can be based on communication between the first receiver device 102 and the first transmitter device 106. Also for example, the second rate 160 can be the communication rate corresponding to the second message 120 or a derivation thereof. The second rate 160 can be based on communication between the first receiver device 102 and the second transmitter device.

Also for example, the first rate 158, the second rate 160, or a combination thereof can be the communication rate corresponding to the first message 118, the second message 120, a derivation thereof, or a combination thereof intended for the first receiver device 102, the second receiver device 104, or a combination thereof. The first rate 158, the second rate 160, or a combination thereof can be based on communication between the first receiver device 102, the second receiver device 104, the first transmitter device 106, the second transmitter device 108, or a combination thereof.

For further illustrative purposes, the computing system 100 will be described as coordinating communication for two independent messages. However, it is understood that the computing system 100 can coordinate and manage three or more simultaneous messages and sets of corresponding devices as described above. For example, the computing system 100 can process and coordinate with a third device 162 or a third set of devices transmitting, receiving, or a combination thereof for independent message, or other additional independent communications.

Figure 2:
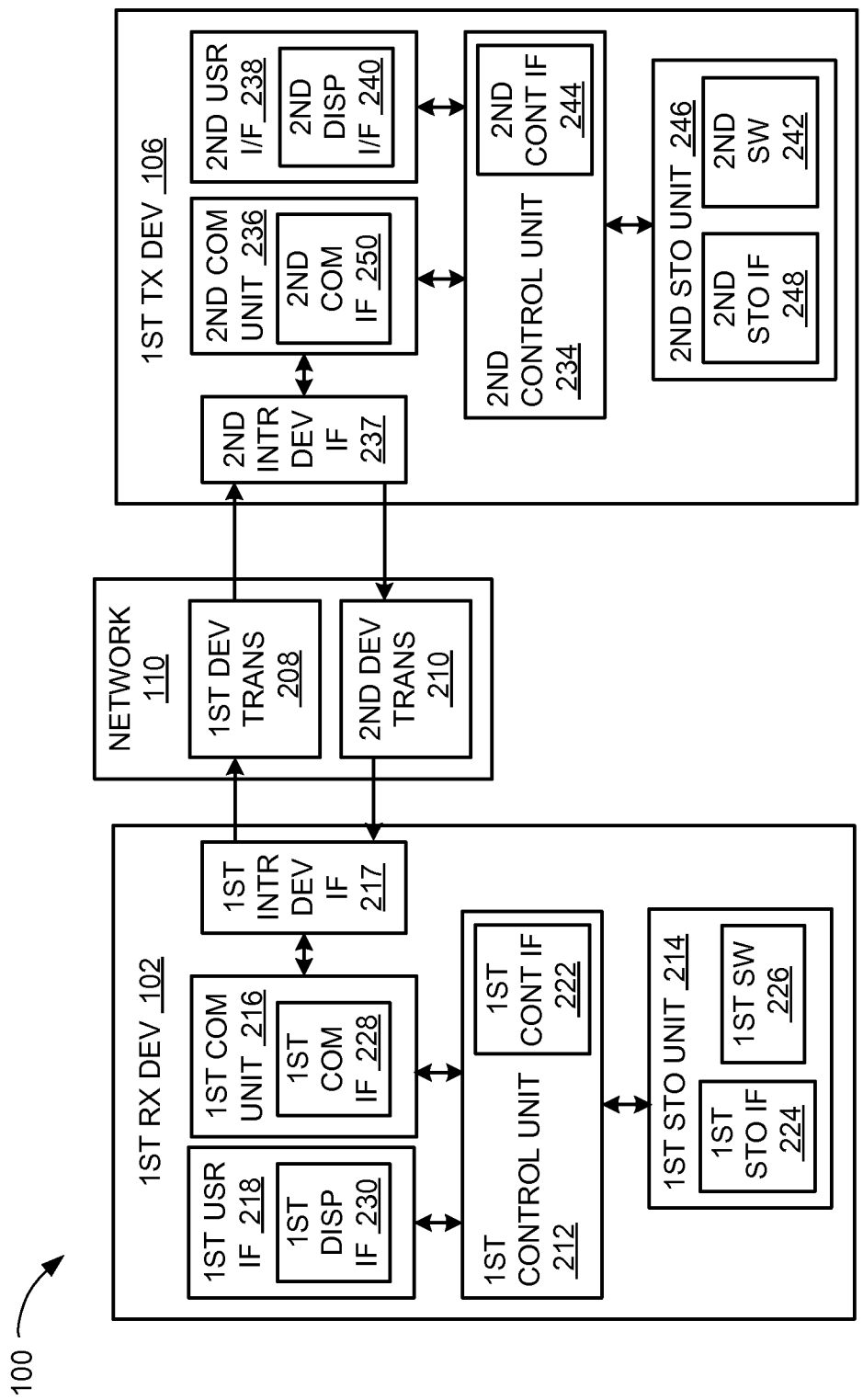
FIG. 2 is an exemplary block diagram of the computing system.

Referring now to FIG. 2, therein is shown an exemplary block diagram of the computing system 100. The computing system 100 can include the first receiver device 102, the network 110, and the first transmitter device 106. The first receiver device 102 can send information in a first device transmission 208 to the first transmitter device 106. The first transmitter device 106 can send information in a second device transmission 210 to the first receiver device 102. The first device transmission 208, the second device transmission 210, or a combination thereof can be communicated over the network 110, including the communication channel.

For illustrative purposes, the computing system 100 is shown with the first receiver device 102 as a client device, although it is understood that the computing system 100 can have the first receiver device 102 as a different type of device. For example, the first receiver device 102 can be a server having a display interface.

Also for illustrative purposes, the computing system 100 is shown with the first transmitter device 106 as a base station, although it is understood that the computing system 100 can have the first transmitter device 106 as a different type of device. For example, the first transmitter device 106 can be a client device or a server.

For brevity of description in this embodiment of the present invention, the first receiver device 102 will be described as a client device and the first transmitter device 106 will be described as a base station. The embodiment of the present invention is not limited to this selection for the type of devices. The selection is an example of an embodiment of the present invention.

The first receiver device 102 can include a first control unit 212, a first storage unit 214, a first communication unit 216, and a first user interface 218. The first control unit 212 can include a first control interface 222. The first control unit 212 can execute a first software 226 to provide the intelligence of the computing system 100.

The first control unit 212 can be implemented in a number of different manners. For example, the first control unit 212 can be a processor, an application specific integrated circuit (ASIC) an embedded processor, a microprocessor, a hardware control logic, a hardware finite state machine (FSM), a digital signal processor (DSP), or a combination thereof. The first control interface 222 can be used for communication between the first control unit 212 and other functional units in the first receiver device 102. The first control interface 222 can also be used for communication that is external to the first receiver device 102.

The first control interface 222 can receive information from the other functional units or from external sources, or can transmit information to the other functional units or to external destinations. The external sources and the external destinations refer to sources and destinations external to the first receiver device 102.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

The first storage unit 214 can store the first software 226. The first storage unit 214 can also store the relevant information, such as data representing incoming images, data representing previously presented image, sound files, or a combination thereof.

The first storage unit 214 can be a volatile memory, a nonvolatile memory, an internal memory, an external memory, or a combination thereof. For example, the first storage unit 214 can be a nonvolatile storage such as non-volatile random access memory (NVRAM), Flash memory, disk storage, or a volatile storage such as static random access memory (SRAM).

The first storage unit 214 can include a first storage interface 224. The first storage interface 224 can be used for communication between the first storage unit 214 and other functional units in the first receiver device 102. The first storage interface 224 can also be used for communication that is external to the first receiver device 102.

The first storage interface 224 can receive information from the other functional units or from external sources, or can transmit information to the other functional units or to external destinations. The external sources and the external destinations refer to sources and destinations external to the first receiver device 102.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the first receiver device 102. For example, the first communication unit 216 can permit the first receiver device 102 to communicate with the first transmitter device 106, a different device, an attachment, such as a peripheral device or a desktop computer, the network 110, or a combination thereof.

The first communication unit 216 can also function as a communication hub allowing the first receiver device 102 to function as part of the network 110 and not limited to be an end point or terminal unit to the network 110. The first communication unit 216 can include active and passive components, such as microelectronics or an antenna, for interaction with the network 110.

The first communication unit 216 can include a baseband device or component, a modem, a digital signal processor, or a combination thereof for transmitting, formatting, receiving, detecting, decoding, further processing, or a combination thereof for communication signals. The first communication unit 216 can include one or more portions for processing the voltages, the currents, the digital information, or a combination thereof, such as an analog-to-digital converter, a digital-to-analog converter, a filter, an amplifier, a processor-type circuitry, or a combination thereof. The first communication unit 216 can further include one or more portions for storing information, such as cache or RAM memory, registers, or a combination thereof.

The first communication unit 216 can be coupled with a first inter-device interface 217. The first inter-device interface 217 can be a device or a portion of a device for physically communicating signals with a separate device. The first inter-device interface 217 can communicate by transmitting or receiving signals to or from another device. The first inter-device interface 217 can include one or more antennas for wireless signals, a physical connection and receiver-transmitter for wired signals, or a combination thereof. The first inter-device interface 217 can include an omnidirectional antenna, a wire, an antenna chip, a ceramic antenna, or a combination thereof. The first inter-device interface 217 can further include a port, a wire, a repeater, a connector, a filter, a sensor, or a combination thereof.

The first inter-device interface 217 can detect or respond to a power in electromagnetic waves and provide the detected result to the first communication unit 216 to receive a signal, including the second device transmission 210. The first inter-device interface 217 can provide a path or respond to currents or voltages provided by the first communication unit 216 to transmit a signal, including the first device transmission 208.

The first communication unit 216 can include a first communication interface 228. The first communication interface 228 can be used for communication between the first communication unit 216 and other functional units in the first receiver device 102. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user (not shown) to interface and interact with the first receiver device 102. The first user interface 218 can include an input device and an output device. Examples of the input device of the first user interface 218 can include a keypad, a touchpad, soft-keys, a keyboard, a microphone, an infrared sensor for receiving remote signals, or any combination thereof to provide data and communication inputs.

The first user interface 218 can include a first display interface 230. The first display interface 230 can include an output device. The first display interface 230 can include a display, a projector, a video screen, a speaker, or any combination thereof.

The first control unit 212 can operate the first user interface 218 to display information generated by the computing system 100. The first control unit 212 can also execute the first software 226 for the other functions of the computing system 100. The first control unit 212 can further execute the first software 226 for interaction with the network 110 via the first communication unit 216.

The first transmitter device 106 can be optimized for implementing an embodiment of the present invention in a multiple device embodiment with the first receiver device 102. The first transmitter device 106 can provide the additional or higher performance processing power compared to the first receiver device 102. The first transmitter device 106 can include a second control unit 234, a second communication unit 236, a second user interface 238, and a second storage unit 246.

The second user interface 238 allows a user (not shown) to interface and interact with the first transmitter device 106. The second user interface 238 can include an input device and an output device. Examples of the input device of the second user interface 238 can include a keypad, a touchpad, soft-keys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control unit 234 can execute a second software 242 to provide the intelligence of the first transmitter device 106 of the computing system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the computing system 100, including operating the second communication unit 236 to communicate with the first receiver device 102 over the network 110.

The second control unit 234 can be implemented in a number of different manners. For example, the second control unit 234 can be a processor, an embedded processor, a microprocessor, hardware control logic, FSM, DSP, or a combination thereof.

The second control unit 234 can include a second control interface 244. The second control interface 244 can be used for communication between the second control unit 234 and other functional units in the first transmitter device 106. The second control interface 244 can also be used for communication that is external to the first transmitter device 106.

The second control interface 244 can receive information from the other functional units or from external sources, or can transmit information to the other functional units or to external destinations. The external sources and the external destinations refer to sources and destinations external to the first transmitter device 106.

The second control interface 244 can be implemented in different ways and can include different implementations depending on which functional units or external units are being interfaced with the second control interface 244. For example, the second control interface 244 can be implemented with a pressure sensor, an inertial sensor, MEMS, optical circuitry, waveguides, wireless circuitry, wireline circuitry, or a combination thereof.

A second storage unit 246 can store the second software 242. The second storage unit 246 can also store the information such as data representing incoming images, data representing previously presented image, sound files, or a combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the computing system 100 is shown with the second storage unit 246 as a single hierarchy storage system, although it is understood that the computing system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as NVRAM, Flash memory, disk storage, or a volatile storage such as SRAM.

The second storage unit 246 can include a second storage interface 248. The second storage interface 248 can be used for communication between the second storage unit 246 and other functional units in the first transmitter device 106. The second storage interface 248 can also be used for communication that is external to the first transmitter device 106.

The second storage interface 248 can receive information from the other functional units or from external sources, or can transmit information to the other functional units or to external destinations. The external sources and the external destinations refer to sources and destinations external to the first transmitter device 106.

The second storage interface 248 can include different implementations depending on which functional units or external units are being interfaced with the second storage unit 246. The second storage interface 248 can be implemented with technologies and techniques similar to the implementation of the second control interface 244.

The second communication unit 236 can enable external communication to and from the first transmitter device 106. For example, the second communication unit 236 can permit the first transmitter device 106 to communicate with the first receiver device 102 over the network 110.

The second communication unit 236 can also function as a communication hub allowing the first transmitter device 106 to function as part of the network 110 and not limited to be an end point or terminal unit to the network 110. The second communication unit 236 can include active and passive components, such as microelectronics or resistors, for interaction with the network 110.

The second communication unit 236 can include a baseband device or component, a modem, a digital signal processor, or a combination thereof for transmitting, formatting, receiving, detecting, decoding, further processing, or a combination thereof for communication signals. The second communication unit 236 can include one or more portions for processing the voltages, the currents, the digital information, or a combination thereof, such as an analog-to-digital converter, a digital-to-analog converter, a filter, an amplifier, a processor-type circuitry, or a combination thereof. The second communication unit 236 can further include one or more portions for storing information, such as cache or RAM memory, registers, or a combination thereof.

The second communication unit 236 can be coupled with a second inter-device interface 237. The second inter-device interface 237 can be a device or a portion of a device for physically communicating signals with a separate device.

The second inter-device interface 237 can communicate by transmitting or receiving signals to or from another device. The second inter-device interface 237 can include one or more antennas for wireless signals, a physical connection and receiver-transmitter for wired signals, or a combination thereof. The second inter-device interface 237 can include an omnidirectional antenna, a wire, an antenna chip, a ceramic antenna, or a combination thereof. The second inter-device interface 237 can further include a port, a wire, a repeater, a connector, a filter, a sensor, or a combination thereof.

The second inter-device interface 237 can detect or respond to a power in electromagnetic waves and provide the detected result to the second communication unit 236 to receive a signal, including the first device transmission 208. The second inter-device interface 237 can provide a path or respond to currents or voltages provided by the second communication unit 236 to transmit a signal, including the second device transmission 210.

The second communication unit 236 can include a second communication interface 250. The second communication interface 250 can be used for communication between the second communication unit 236 and other functional units in the first transmitter device 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second control interface 244.

The first communication unit 216 can couple with the network 110 to send information to the first transmitter device 106 in the first device transmission 208. The first transmitter device 106 can receive information in the second communication unit 236 from the first device transmission 208 of the network 110.

The second communication unit 236 can couple with the network 110 to send information to the first receiver device 102 in the second device transmission 210. The first receiver device 102 can receive information in the first communication unit 216 from the second device transmission 210 of the network 110. The computing system 100 can be executed by the first control unit 212, the second control unit 234, or a combination thereof. For illustrative purposes, the first transmitter device 106 is shown with the partition having the second user interface 238, the second storage unit 246, the second control unit 234, and the second communication unit 236, although it is understood that the first transmitter device 106 can have a different partition. For example, the second software 242 can be partitioned differently such that some or all of its function can be in the second control unit 234 and the second communication unit 236. Also, the first transmitter device 106 can include other functional units not shown in FIG. 2 for clarity.

The functional units in the first receiver device 102 can work individually and independently of the other functional units. The first receiver device 102 can work individually and independently from the first transmitter device 106 and the network 110.

The functional units in the first transmitter device 106 can work individually and independently of the other functional units. The first transmitter device 106 can work individually and independently from the first receiver device 102 and the network 110.

The functional units described above can be implemented in hardware. For example, one or more of the functional units can be implemented using the a gate, circuitry, a processor, a computer, integrated circuit, integrated circuit cores, a pressure sensor, an inertial sensor, MEMS, a passive device, a physical non-transitory memory medium having instructions for performing the software function, a portion therein, or a combination thereof.

For illustrative purposes, the computing system 100 is described by operation of the first receiver device 102 and the first transmitter device 106. It is understood that the first receiver device 102 and the first transmitter device 106 can operate any of the modules and functions of the computing system 100.

Figure 3:
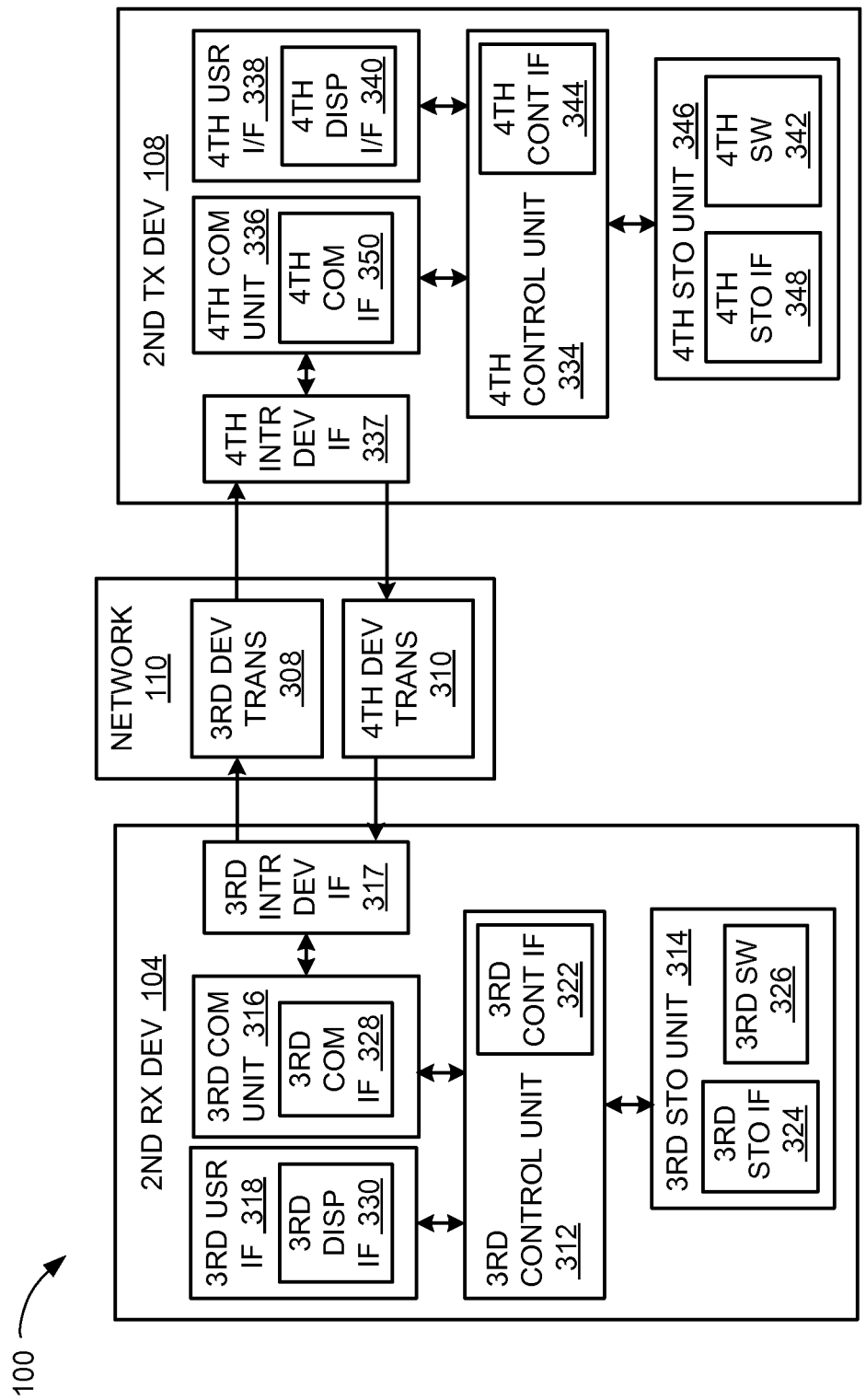
FIG. 3 is a further exemplary block diagram of the computing system.

Referring now to FIG. 3, therein is shown an exemplary block diagram of the computing system 100. The computing system 100 can include the second receiver device 104, the network 110, and the second transmitter device 108. The second receiver device 104 can send information in a third device transmission 308 to the second transmitter device 108. The second transmitter device 108 can send information in a fourth device transmission 310 to the second receiver device 104. The third device transmission 308, the fourth device transmission 310, or a combination thereof can be communicated over the network 110, including the communication channel.

For illustrative purposes, the computing system 100 is shown with the second receiver device 104 as a client device, although it is understood that the computing system 100 can have the second receiver device 104 as a different type of device. For example, the second receiver device 104 can be a server having a display interface.

Also for illustrative purposes, the computing system 100 is shown with the second transmitter device 108 as a base station, although it is understood that the computing system 100 can have the second transmitter device 108 as a different type of device. For example, the second transmitter device 108 can be a client device or a server.

For brevity of description in this embodiment of the present invention, the second receiver device 104 will be described as a client device and the second transmitter device 108 will be described as a base station. The embodiment of the present invention is not limited to this selection for the type of devices. The selection is an example of an embodiment of the present invention.

The second receiver device 104 can include a third control unit 312, a third storage unit 314, a third communication unit 316, and a third user interface 318. The third control unit 312 can include a third control interface 322. The third control unit 312 can execute a third software 326 to provide the intelligence of the computing system 100.

The third control unit 312 can be implemented in a number of different manners. For example, the third control unit 312 can be a processor, an application specific integrated circuit (ASIC) an embedded processor, a microprocessor, a hardware control logic, a hardware finite state machine (FSM), a digital signal processor (DSP), or a combination thereof. The third control interface 322 can be used for communication between the third control unit 312 and other functional units in the second receiver device 104. The third control interface 322 can also be used for communication that is external to the second receiver device 104.

The third control interface 322 can receive information from the other functional units or from external sources, or can transmit information to the other functional units or to external destinations. The external sources and the external destinations refer to sources and destinations external to the second receiver device 104.

The third control interface 322 can be implemented in different ways and can include different implementations depending on which functional units or external units are being interfaced with the third control interface 322. For example, the third control interface 322 can be implemented with a pressure sensor, an inertial sensor, a microelectromechanical system (MEMS), optical circuitry, waveguides, wireless circuitry, wireline circuitry, or a combination thereof.

The third storage unit 314 can store the third software 326. The third storage unit 314 can also store the relevant information, such as data representing incoming images, data representing previously presented image, sound files, or a combination thereof.

The third storage unit 314 can be a volatile memory, a nonvolatile memory, an internal memory, an external memory, or a combination thereof. For example, the third storage unit 314 can be a nonvolatile storage such as non-volatile random access memory (NVRAM), Flash memory, disk storage, or a volatile storage such as static random access memory (SRAM).

The third storage unit 314 can include a third storage interface 324. The third storage interface 324 can be used for communication between the third storage unit 314 and other functional units in the second receiver device 104. The third storage interface 324 can also be used for communication that is external to the second receiver device 104.

The third storage interface 324 can receive information from the other functional units or from external sources, or can transmit information to the other functional units or to external destinations. The external sources and the external destinations refer to sources and destinations external to the second receiver device 104.

The third storage interface 324 can include different implementations depending on which functional units or external units are being interfaced with the third storage unit 314. The third storage interface 324 can be implemented with technologies and techniques similar to the implementation of the third control interface 322.

The third communication unit 316 can enable external communication to and from the second receiver device 106. For example, the third communication unit 316 can permit the second receiver device 104 to communicate with the second transmitter device 108, a different device, an attachment, such as a peripheral device or a desktop computer, the network 110, or a combination thereof.

The third communication unit 316 can also function as a communication hub allowing the second receiver device 104 to function as part of the network 110 and not limited to be an end point or terminal unit to the network 110. The third communication unit 316 can include active and passive components, such as microelectronics or an antenna, for interaction with the network 110.

The third communication unit 316 can include a baseband device or component, a modem, a digital signal processor, or a combination thereof for transmitting, formatting, receiving, detecting, decoding, further processing, or a combination thereof for communication signals. The third communication unit 316 can include one or more portions for processing the voltages, the currents, the digital information, or a combination thereof, such as an analog-to-digital converter, a digital-to-analog converter, a filter, an amplifier, a processor-type circuitry, or a combination thereof. The third communication unit 316 can further include one or more portions for storing information, such as cache or RAM memory, registers, or a combination thereof.

The third communication unit 316 can be coupled with a third inter-device interface 317. The third inter-device interface 317 can be a device or a portion of a device for physically communicating signals with a separate device. The third inter-device interface 317 can communicate by transmitting or receiving signals to or from another device. The third inter-device interface 317 can include one or more antennas for wireless signals, a physical connection and receiver-transmitter for wired signals, or a combination thereof. The third inter-device interface 317 can include an omnidirectional antenna, a wire, an antenna chip, a ceramic antenna, or a combination thereof. The third inter-device interface 317 can further include a port, a wire, a repeater, a connector, a filter, a sensor, or a combination thereof.

The third inter-device interface 317 can detect or respond to a power in electromagnetic waves and provide the detected result to the third communication unit 316 to receive a signal, including the fourth device transmission 310. The third inter-device interface 317 can provide a path or respond to currents or voltages provided by the third communication unit 316 to transmit a signal, including the third device transmission 308.

The third communication unit 316 can include a third communication interface 328. The third communication interface 328 can be used for communication between the third communication unit 316 and other functional units in the second receiver device 104. The third communication interface 328 can receive information from the other functional units or can transmit information to the other functional units.

The third communication interface 328 can include different implementations depending on which functional units are being interfaced with the third communication unit 316. The third communication interface 328 can be implemented with technologies and techniques similar to the implementation of the third control interface 322.

The third user interface 318 allows a user (not shown) to interface and interact with the second receiver device 104. The third user interface 318 can include an input device and an output device. Examples of the input device of the third user interface 318 can include a keypad, a touchpad, softkeys, a keyboard, a microphone, an infrared sensor for receiving remote signals, or any combination thereof to provide data and communication inputs.

The third user interface 318 can include a third display interface 330. The third display interface 330 can include an output device. The third display interface 330 can include a display, a projector, a video screen, a speaker, or any combination thereof.

The third control unit 312 can operate the third user interface 318 to display information generated by the computing system 100. The third control unit 312 can also execute the third software 326 for the other functions of the computing system 100. The third control unit 312 can further execute the third software 326 for interaction with the network 110 via the third communication unit 316.

The second transmitter device 108 can be optimized for implementing an embodiment of the present invention in a multiple device embodiment with the second receiver device 104. The second transmitter device 108 can provide the additional or higher performance processing power compared to the second receiver device 104. The second transmitter device 108 can include a fourth control unit 334, a fourth communication unit 336, a fourth user interface 338, and a fourth storage unit 346.

The fourth user interface 338 allows a user (not shown) to interface and interact with the second transmitter device 108. The fourth user interface 338 can include an input device and an output device. Examples of the input device of the fourth user interface 338 can include a keypad, a touchpad, soft-keys, a keyboard, a microphone, or any combination thereof to provide data and communication inputs. Examples of the output device of the fourth user interface 338 can include a fourth display interface 340. The fourth display interface 340 can include a display, a projector, a video screen, a speaker, or any combination thereof.

The fourth control unit 334 can execute a fourth software 342 to provide the intelligence of the second transmitter device 108 of the computing system 100. The fourth software 342 can operate in conjunction with the third software 326. The fourth control unit 334 can provide additional performance compared to the third control unit 312.

The fourth control unit 334 can operate the fourth user interface 338 to display information. The fourth control unit 334 can also execute the fourth software 342 for the other functions of the computing system 100, including operating the fourth communication unit 336 to communicate with the second receiver device 104 over the network 110.

The fourth control unit 334 can be implemented in a number of different manners. For example, the fourth control unit 334 can be a processor, an embedded processor, a microprocessor, hardware control logic, FSM, DSP, or a combination thereof.

The fourth control unit 334 can include a fourth control interface 344. The fourth control interface 344 can be used for communication between the fourth control unit 334 and other functional units in the second transmitter device 108. The fourth control interface 344 can also be used for communication that is external to the second transmitter device 108.

The fourth control interface 344 can receive information from the other functional units or from external sources, or can transmit information to the other functional units or to external destinations. The external sources and the external destinations refer to sources and destinations external to the second transmitter device 108.

The fourth control interface 344 can be implemented in different ways and can include different implementations depending on which functional units or external units are being interfaced with the fourth control interface 344. For example, the fourth control interface 344 can be implemented with a pressure sensor, an inertial sensor, MEMS, optical circuitry, waveguides, wireless circuitry, wireline circuitry, or a combination thereof.

A fourth storage unit 346 can store the fourth software 342. The fourth storage unit 346 can also store the information such as data representing incoming images, data representing previously presented image, sound files, or a combination thereof. The fourth storage unit 346 can be sized to provide the additional storage capacity to supplement the third storage unit 314.

For illustrative purposes, the fourth storage unit 346 is shown as a single element, although it is understood that the fourth storage unit 346 can be a distribution of storage elements. Also for illustrative purposes, the computing system 100 is shown with the fourth storage unit 346 as a single hierarchy storage system, although it is understood that the computing system 100 can have the fourth storage unit 346 in a different configuration. For example, the fourth storage unit 346 can be formed with different storage technologies forming a memory hierarchal system including different levels of caching, main memory, rotating media, or off-line storage.

The fourth storage unit 346 can be a volatile memory, a nonvolatile memory, an internal memory, an external memory, or a combination thereof. For example, the fourth storage unit 346 can be a nonvolatile storage such as NVRAM, Flash memory, disk storage, or a volatile storage such as SRAM.

The fourth storage unit 346 can include a fourth storage interface 348. The fourth storage interface 348 can be used for communication between the fourth storage unit 346 and other functional units in the second transmitter device 108. The fourth storage interface 348 can also be used for communication that is external to the second transmitter device 108.

The fourth storage interface 348 can receive information from the other functional units or from external sources, or can transmit information to the other functional units or to external destinations. The external sources and the external destinations refer to sources and destinations external to the second transmitter device 108.

The fourth storage interface 348 can include different implementations depending on which functional units or external units are being interfaced with the fourth storage unit 346. The fourth storage interface 348 can be implemented with technologies and techniques similar to the implementation of the fourth control interface 344.

The fourth communication unit 336 can enable external communication to and from the second transmitter device 108. For example, the fourth communication unit 336 can permit the second transmitter device 108 to communicate with the second receiver device 104 over the network 110.

The fourth communication unit 336 can also function as a communication hub allowing the second transmitter device 108 to function as part of the network 110 and not limited to be an end point or terminal unit to the network 110. The fourth communication unit 336 can include active and passive components, such as microelectronics or resistors, for interaction with the network 110.

The fourth communication unit 336 can include a baseband device or component, a modem, a digital signal processor, or a combination thereof for transmitting, formatting, receiving, detecting, decoding, further processing, or a combination thereof for communication signals. The fourth communication unit 336 can include one or more portions for processing the voltages, the currents, the digital information, or a combination thereof, such as an analog-to-digital converter, a digital-to-analog converter, a filter, an amplifier, a processor-type circuitry, or a combination thereof. The fourth communication unit 336 can further include one or more portions for storing information, such as cache or RAM memory, registers, or a combination thereof.

The fourth communication unit 336 can be coupled with a fourth inter-device interface 337. The fourth inter-device interface 337 can be a device or a portion of a device for physically communicating signals with a separate device. The fourth inter-device interface 337 can communicate by transmitting or receiving signals to or from another device. The fourth inter-device interface 337 can include one or more antennas for wireless signals, a physical connection and receiver-transmitter for wired signals, or a combination thereof. The fourth inter-device interface 337 can include an omnidirectional antenna, a wire, an antenna chip, a ceramic antenna, or a combination thereof. The fourth inter-device interface 337 can further include a port, a wire, a repeater, a connector, a filter, a sensor, or a combination thereof.

The fourth inter-device interface 337 can detect or respond to a power in electromagnetic waves and provide the detected result to the fourth communication unit 336 to receive a signal, including the third device transmission 308. The fourth inter-device interface 337 can provide a path or respond to currents or voltages provided by the fourth communication unit 336 to transmit a signal, including the fourth device transmission 310.

The fourth communication unit 336 can include a fourth communication interface 350. The fourth communication interface 350 can be used for communication between the fourth communication unit 336 and other functional units in the second transmitter device 108. The fourth communication interface 350 can receive information from the other functional units or can transmit information to the other functional units.

The fourth communication interface 350 can include different implementations depending on which functional units are being interfaced with the fourth communication unit 336. The fourth communication interface 350 can be implemented with technologies and techniques similar to the implementation of the fourth control interface 344.

The third communication unit 316 can couple with the network 110 to send information to the second transmitter device 108 in the third device transmission 308. The second transmitter device 108 can receive information in the fourth communication unit 336 from the third device transmission 308 of the network 110.

The fourth communication unit 336 can couple with the network 110 to send information to the second receiver device 104 in the fourth device transmission 310. The second receiver device 104 can receive information in the third communication unit 316 from the fourth device transmission 310 of the network 110. The computing system 100 can be executed by the third control unit 312, the fourth control unit 334, or a combination thereof. For illustrative purposes, the second transmitter device 108 is shown with the partition having the fourth user interface 338, the fourth storage unit 346, the fourth control unit 334, and the fourth communication unit 336, although it is understood that the second transmitter device 108 can have a different partition. For example, the fourth software 342 can be partitioned differently such that some or all of its function can be in the fourth control unit 334 and the fourth communication unit 336. Also, the second transmitter device 108 can include other functional units not shown in FIG. 3 for clarity.

The functional units in the second receiver device 104 can work individually and independently of the other functional units. The second receiver device 104 can work individually and independently from the second transmitter device 108 and the network 110.

The functional units in the second transmitter device 108 can work individually and independently of the other functional units. The second transmitter device 108 can work individually and independently from the second receiver device 104 and the network 110.

The functional units described above can be implemented in hardware. For example, one or more of the functional units can be implemented using the a gate, circuitry, a processor, a computer, integrated circuit, integrated circuit cores, a pressure sensor, an inertial sensor, MEMS, a passive device, a physical non-transitory memory medium having instructions for performing the software function, a portion therein, or a combination thereof.

For illustrative purposes, the computing system 100 is described by operation of the second receiver device 104 and the second transmitter device 108. It is understood that the second receiver device 104 and the second transmitter device 108 can operate any of the modules and functions of the computing system 100.

Figure 4:
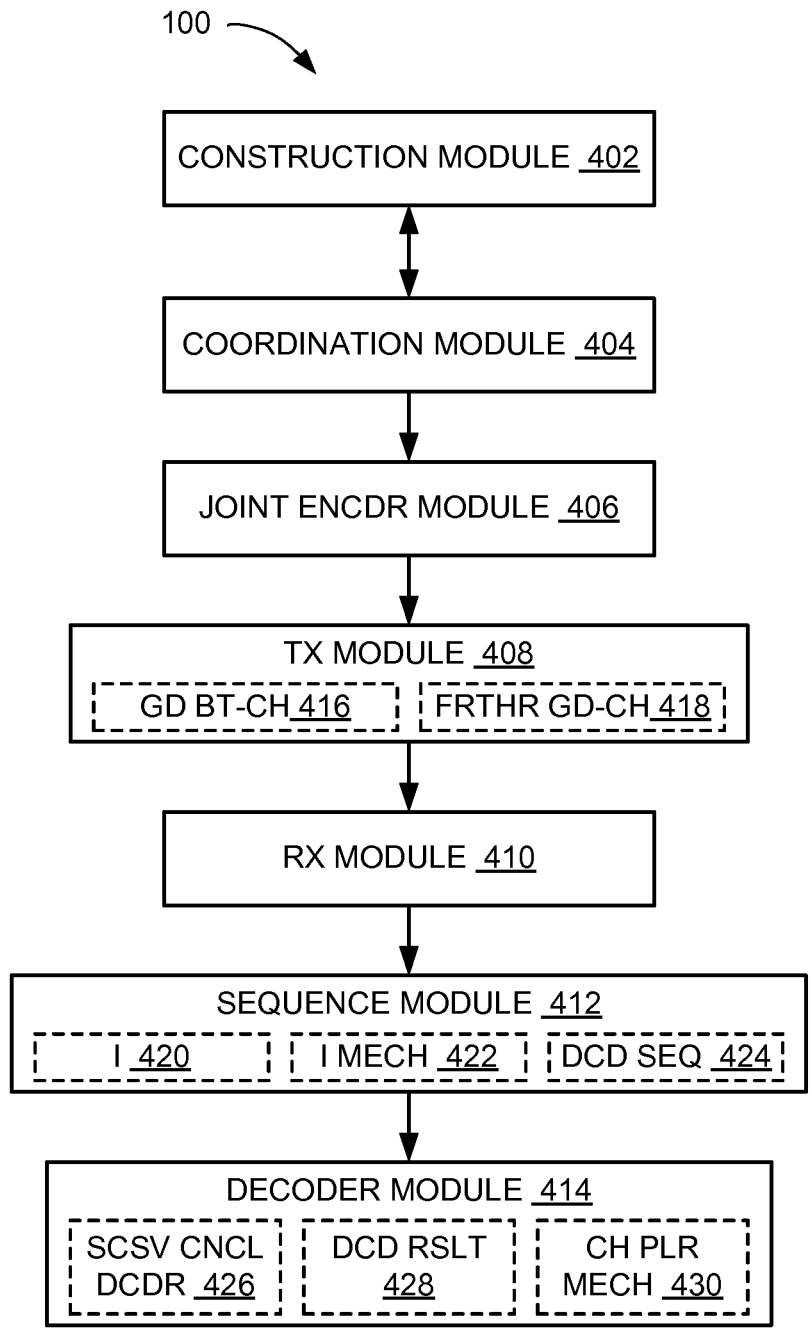
FIG. 4 is a control flow of the computing system.

Referring now to FIG. 4, therein is shown a control flow of the computing system 100. The computing system 100 can include a construction module 402, a coordination module 404, a joint encoder module 406, a transmission module 408, a receiver module 410, a sequence module 412, a decoder module 414, or a combination thereof.

The construction module 402 can be coupled with the coordination module 404, which can be coupled to the joint encoder module 406. The joint encoder module 406 can be coupled to the transmission module 408. The transmission module 408 can be coupled to the receiver module 410. The receiver module 410 can be coupled to the sequence module 412, which can be further coupled to the decoder module 414.

The modules can be coupled to each other in a variety of ways. For example, modules can be coupled by having the input of one module connected to the output of another, such as by using wired or wireless connections, the network 110 of FIG. 1, instructional steps, process sequence, or a combination thereof. Also for example, the modules can be coupled either directly with no intervening structure other than connection means between the directly coupled modules, or indirectly with modules or devices other than the connection means between the indirectly coupled modules.

As a more specific example, one or more inputs or outputs of the construction module 402 can be directly connected to one or more inputs or outputs of the coordination module 404 using conductors or the transmission channel without intervening modules or devices there-between. Also as a more specific example, the construction module 402 can be coupled with the coordination module 404 indirectly using a repeater, a switch, a routing device, a separate process, or a combination thereof there-between.

Also as a more specific example, the transmission module 408 and the receiver module 410 can be coupled directly or indirectly using the network 110, the communication channel, or a combination thereof. The construction module 402, the coordination module 404, the joint encoder module 406, the transmission module 408, the receiver module 410, the decoder module 414, the sequence module 412, or a combination thereof can be coupled directly or indirectly in similar ways.

The computing system 100 can communicate with or using a device, such as by displaying images, recreating sounds, exchanging process steps or instructions, or a combination thereof. The computing system 100 can communicate information between devices. The receiving device can further communicate with the user by displaying images, recreating sounds, exchanging process steps or instructions, or a combination thereof according to the information communicate to the device.

The construction module 402 is configured to construct information for communication between devices. The construction module 402 can receive content data, format the content data, arrange the content data, or a combination thereof to construct the information for communication.

For example, the construction module 402 can receive the first content data 122 of FIG. 1, the second content data 126 of FIG. 1, or a combination thereof. Also for example, the construction module 402 can generate the first message 118 of FIG. 1, the second message 120 of FIG. 1, or a combination thereof as the information for combination based on processing the first content data 122, the second content data 126, or a combination thereof.

The construction module 402 can receive the first content data 122, the second content data 126, or a combination thereof from the user (not shown) using the first user interface 218 of FIG. 2, the second user interface 238 of FIG. 2, the third user interface 318 of FIG. 3, the fourth user interface 338 of FIG. 3, or a combination thereof. The construction module 402 can further receive the first content data 122, the second content data 126, or a combination thereof using the first storage interface 224 of FIG. 2, the second storage interface 248 of FIG. 2, the third storage interface 324 of FIG. 3, the fourth storage interface 348 of FIG. 3, the first control interface 222 of FIG. 2, the second control interface 244 of FIG. 2, the third control interface 322 of FIG. 3, the fourth control interface 344 of FIG. 3, or a combination thereof.

The construction module 402 can construct information based on coordinating between multiple communications. The construction module 402 can generate the first message 118, the second message 120, or a combination thereof according to the message construction mechanism 134 of FIG. 1. The construction module 402 can generate the first message 118, the second message 120, or a combination thereof according to the message construction mechanism 134 for coordinating the first message 118 with the second message 120 using the coordination profile 140 of FIG. 1.

The construction module 402 can determine the channel characterization 156 of FIG. 1 for constructing the communication information. The construction module 402 can determine the channel characterization 156 based on any a priori knowledge or any information previously known to the computing system 100 or a device therein.

For example, the construction module 402 can determine the channel characterization 156 based on CQI feedback from or interaction with an intended communication recipient, such as the first receiver device 102 of FIG. 1, the second receiver device 104 of FIG. 1, the third device 162 of FIG. 1, or a combination thereof based on a previous communication. Also for example, the construction module 402 can determine the channel characterization 156 based on communication records, channel information, communication rate, error rate, or a combination thereof for previous communications regarding specific locations, for specific communication channels, for specific device combinations, or a combination thereof.

The construction module 402 can use the first communication unit 216 of FIG. 2, the second communication unit 236 of FIG. 2, the third communication unit 316 of FIG. 3, the fourth communication unit 336 of FIG. 3, or a combination thereof to determine the channel characterization 156. The construction module 402 can store the channel characterization 156, access previously stored instance thereof, or a combination thereof using the first storage unit 214 of FIG. 2, the second storage unit 246 of FIG. 2, the third storage unit 314 of FIG. 3, the fourth storage unit 346 of FIG. 3, or a combination thereof.

After determining the channel characterization 156, the control flow can pass to the coordination module 404. The control flow can pass through a variety of ways. For example, control flow can pass by having processing results of one module passed to another module, such as by passing the channel characterization 156 from the construction module 402 to the coordination module 404, by storing the processing results at a location known and accessible to the other module, such as by storing the channel characterization 156 at a storage location known and accessible to the coordination module 404, by notifying the other module, such as by using a flag, an interrupt, a status signal, or a combination for the coordination module 404, or a combination of processes thereof.

The coordination module 404 is configured to coordinate communication of multiple independent messages. The coordination module 404 can coordinate communication of the first content data 122, the second content data 126, additional content, or a combination thereof for simultaneous or concurrent communication.

The coordination module 404 can coordinate the construction of messages. The coordination module 404 can coordinate the construction of messages for utilizing the message polarization mechanism 136 of FIG. 1. The coordination module 404 can coordinate construction of the first message 118, the second message 120, any additional message, or a combination thereof for utilizing same value or instance of the message polarization mechanism 136 across separate transmission devices, such as for the first transmitter device 106 of FIG. 1, the second transmitter device 108 of FIG. 1, the third device 162, or a combination thereof.

The coordination module 404 can coordinate by calculating and communicating the coordination profile 140. The coordination module 404 can calculate the coordination profile 140 based on the channel characterization 156. The coordination module 404 can calculate the coordination profile 140 for coordinating by communicating the coordination profile 140 between the first transmitter device 106, the second transmitter device 108, the third device 162, any other transmitting device, or a combination thereof. The coordination module 404 can calculate the coordination profile 140 in a variety of ways.

For example, the coordination module 404 can calculate the coordination profile 140 based on the channel characterization 156 corresponding to each communication. The coordination module 404 can include a method, a process, an equation, a table, or a combination thereof for the coordination mechanism 112 of FIG. 1 using the channel characterization 156 as input in calculating the coordination profile 140.

Also for example, the coordination module 404 can calculate the coordination profile 140 utilizing an interaction between the transmitting devices according to the coordination mechanism 112. The coordination module 404 can utilize the coordination mechanism 112, the coordination link 114 of FIG. 1, or a combination thereof to share the channel characterization 156, the communication rate, the content configuration 138 of FIG. 1, device identification, device capacity, or a combination thereof between the first transmitter device 106, the second transmitter device 108, the third device 162, other transmitting devices, or a combination thereof.

The coordination module 404 can calculate the coordination profile 140 by determining the rate profile 142 of FIG. 1, or a portion therein, such as the first rate set 146 of FIG. 1, the second rate set 148 of FIG. 1, or a combination thereof. The coordination module 404 can calculate the coordination profile 140 based on the channel characterization 156, corresponding devices, capacity of the corresponding devices, previous communication rates, or a combination thereof.

For example, the coordination module 404 can determine the first rate set 146, the second rate set 148, or a combination thereof based on maximum possible communication rates according to the channel conditions, capacity or capability of corresponding devices, or a combination thereof. The coordination module 404 can determine the first rate set 146, the second rate set 148, or a combination thereof can be calculated by estimating efficiency or rate for decoding the message of one user while assuming that the message of other user is noise, and then decoding the other user's message assuming that the first user's message is known, which can regarded as separate decoding.

The coordination module 404 can calculate the coordination profile 140 by further determining the uniform rate region 144 of FIG. 1. The coordination module 404 can determine the uniform rate region 144 as the set of combination of rates connecting or between the determined rate sets.

For example, the coordination module 404 can determine the uniform rate region 144 as a line, a plane, a shape, or a combination thereof connecting the rate sets, such as the first rate set 146 and the second rate set 148. Also for example, the coordination module 404 can determine the uniform rate region 144 including the rate sets using other predetermined requirement, such as a slope, an intersection, a direction, a shape, or a combination thereof.

As a more specific example, the coordination module 404 can represent individual communication rates along an axis. The coordination module 404 can determine a maximum capacity rate for each device and represent the maximum as an offset or an intercept with corresponding axis. The coordination module 404 can represent the rate sets as a point extending perpendicularly away from the intercept point according to capacity or capability of corresponding device. The coordination module 404 can connect the rate sets to determine the uniform rate region 144.

The coordination module 404 can calculate the communication rate for multiple transmission devices based on the uniform rate region 144. For example, the coordination module 404 can calculate the first rate 158 of FIG. 1, the second rate 160 of FIG. 1, the communication rate corresponding to the third device 162 or any additional transmitting device, or a combination thereof.

The coordination module 404 can calculate the communication rate set maximizing the overall communication rate for the computing system 100, such as for maximizing a combination of the communication rates for all of the separate communications. For example, the coordination module 404 can calculate the first rate 158 and the second rate 160, and including any additional rates, from within the capacity of the transmitting devices as represented by the rate profile 142. The coordination module 404 can calculate the first rate 158 and the second rate 160, and any additional rates as the set of rates along the uniform rate region 144 maximizing the combined result thereof.

The coordination module 404 can calculate the coordination profile 140 using the first communication unit 216, the second communication unit 236, the third communication unit 316, the fourth communication unit 336, the first control unit 212 of FIG. 2, the second control unit 234 of FIG. 2, the third control unit 312 of FIG. 3, the fourth control unit 334 of FIG. 3, or a combination thereof. The coordination module 404 can store the coordination profile 140 in the first communication unit 216, the second communication unit 236, the third communication unit 316, the fourth communication unit 336, the first storage unit 214, the second storage unit 246, the third storage unit 314, the fourth storage unit 346, or a combination thereof.

The coordination module 404 can communicate the coordination profile 140, such as between transmitting devices. The coordination module 404 can communicate the coordination profile 140 between the first transmitter device 106, the second transmitter device 108, the third device 162, any other additional transmitter, or a combination thereof.

The coordination module 404 can communicate the coordination profile 140 based on the coordination mechanism 112 for coordinating the second transmitter device 108 with the first transmitter device 106. The coordination module 404 can use the coordination link 114, the network 110, the first inter-device interface 217 of FIG. 2, the second inter-device interface 237 of FIG. 2, the third inter-device interface 317 of FIG. 3, the fourth inter-device interface 337 of FIG. 3, or a combination thereof to communicate the coordination profile 140.

After calculating and communicating the coordination profile 140, the control flow can be passed from the coordination module 404 to the construction module 402, the joint encoder module 406, or a combination thereof. The control flow can pass similarly as described above between the construction module 402 and the coordination module 404, but using processing results of the construction module 402, such as the coordination profile 140.

The construction module 402 can further construct the first message 118, the second message 120, any additional messages, or a combination thereof based on the coordination profile 140 for coordinating the messages. The construction module 402 can construct the first message 118, the second message 120, any additional messages, or a combination thereof according to the message construction mechanism 134 based on the coordination profile 140.

The construction module 402 can construct the first message 118, the second message 120, any additional messages, or a combination thereof by generating the corresponding format data, such as the first format data 124 of FIG. 1, the second format data 128 of FIG. 1, or a combination thereof. The construction module 402 can generate the format data according to the message construction mechanism 134.

For example, the construction module 402 can generate the first format data 124, the second format data 128, or a combination thereof by controlling a location or a sequence of specific information types or values within the first message 118, the second message 120, or a combination thereof. Also for example, the construction module 402 can generate the first format data 124, the second format data 128, or a combination thereof by adding specific type of information or specific values within the first message 118, the second message 120, or a combination thereof.

As a more specific example, the construction module 402 can generate the first format data 124, the second format data 128, or a combination thereof as one or more instance of bits frozen to zero value. Also as a more specific example, the construction module 402 can calculate the content configuration 138 for controlling the location or the sequence of the content data and the format data within the first message 118, the second message 120, or a combination thereof.

The construction module 402 can construct the message intended for transmission, such as the first message 118, the second message 120, or a combination thereof, by combining the content portion and the format portion. For example, the construction module 402 can construct the first message 118 including the first content data 122 combined with the first format data 124. Also for example, the construction module 402 can construct the second message 120 including the second content data 126 combined with the second format data 128.

The construction module 402 can combine the content portion and the format portion according to the content configuration 138. The construction module 402 can combine the content portion and the format portion for multiple separate messages according to the content configuration 138.

The construction module 402 can calculate the content configuration 138 for coordinating multiple instances of messages, such as for not overlapping multiple instances of the content portion, for utilizing one or more specific bit channels, for optimizing multiple transmission and minimizing interference, or a combination thereof. The construction module 402 can calculate the content configuration 138 for controlling positions of information bits for the content data by viewing the entire block for the 'm' users as a single polar transformation and by regarding the MAC operation as one more level of polarization.

The construction module 402 can combine the content portion and the format portion according to the content configuration 138 for coordinating the separate messages utilizing the format portion and the content portion therein. The content configuration 138 can be calculated based on the coordination profile 140.

For example, the construction module 402 can construct the first message 118 including the first content data 122 and the first format data 124 according to the content configuration 138 for the first message 118 for coordinating the first message 118 with the second message 120 using the coordination profile 140. Also for example, the construction module 402 can construct the second message 120 including the second content data 126 and the second format data 128 according to the content configuration 138 specific for the second message 120 for coordinating the second message 120 with the first message 118 using the coordination profile 140.

As a more specific example, the content configuration 138 can be calculated based on the rate profile 142, the uniform rate region 144, the first rate 158 thereof, the second rate 160 thereof, or a combination thereof. As a further specific example, the construction module 402 can designate specific locations, values, or a combination thereof in addition to the content for calculating the format data according to the designated or estimated communication rates.

The construction module 402 and the coordination module 404 can iteratively process the information to coordinate and construct messages. For example, the coordination module 404 can further communicate the coordination profile 140 including the content configuration 138 between devices.

The coordination module 404 can receive the content configuration 138 from the construction module 402. The coordination module 404 can communicate the content configuration 138 between transmitting devices based on the coordination mechanism 112 for coordinating multiple transmissions. The coordination module 404 can communicate the coordination profile 140 including the content configuration 138 as described above.

For example, the coordination module 404 can communicate the content configuration 138 using the coordination link 114, the coordination mechanism 112, the communication channel, the network 110, or a combination thereof. Also for example, the coordination module 404 can communicate the coordination profile 140 including the content configuration 138 between the first transmitter device 106, the second transmitter device 108, the third device 162, any additional transmitting device, or a combination thereof for coordinating simultaneous or concurrent transmission of multiple devices.

The construction module 402 can receive the coordination profile 140 including content configuration 138 of a different transmitting device and adjust the content configuration 138 for the corresponding device. For example, the construction module 402 can receive the content configuration 138 for the first transmitter device 106 and adjust the content configuration 138 for the second transmitter device 108 for eliminating overlaps in the transmission of the first content data 122 and the second content data 126, for utilizing one or more specific bit channels for transmission of the content data and the format data for the two devices, for optimizing multiple transmission and minimizing interference, or a combination thereof.

Also for example, the construction module 402 can similarly receive the content configuration 138 for the second transmitter device 108 and adjust the content configuration 138 for the first transmitter device 106. Also for example, the construction module 402 can similarly receive and adjust for three devices or more, such as including the third device 162 or any additional transmitting devices.

It has been discovered that the first message 118 including the first format data 124 coordinated with the second message 120 including the second format data 128 based on the message construction mechanism 134 provides increased overall efficiency in communication. The message construction mechanism 134 based on the coordination profile 140 can allow for multiplexing of the first content data 122 and the second content data 126 with the first message 118 and the second message 120. The coordination and multiplexing can be used to utilize the best-available conditions or resources shared for multiple users, thereby increasing the overall efficiency.

The construction module 402 can use the first communication unit 216, the second communication unit 236, the third communication unit 316, the fourth communication unit 336, the first control unit 212, the second control unit 234, the third control unit 312, the fourth control unit 334, or a combination thereof to construct the messages intended for transmission. The construction module 402 can store the constructed messages in the first communication unit 216, the second communication unit 236, the third communication unit 316, the fourth communication unit 336, the first storage unit 214, the second storage unit 246, the third storage unit 314, the fourth storage unit 446, or a combination thereof.

After constructing the messages intended for transmission, the control flow can be passed from the coordination module 404, the construction module 402, or a combination thereof to the joint encoder module 406. The control flow can pass similarly as described above between the construction module 402 and the coordination module 404, but using processing results of the construction module 402, such as the coordination profile 140.

The joint encoder module 406 is configured to encode the messages intended for communication. For example, the joint encoder module 406 can generate the first encoded message 130 of FIG. 1, the second encoded message 132 of FIG. 1, or a combination thereof. The joint encoder module 406 can generate the first encoded message 130 based on encoding the first message 118, the second encoded message 132 based on encoding the second message 120, or a combination thereof.

The joint encoder module 406 can encode using the message polarization mechanism 136. The message polarization mechanism 136 can be represented as '$G^{\otimes n}$', with baseline polarization matrix 'G' raised to the Kronecker power n. The message polarization mechanism 136 can be for transmitting through 'n' independent copies of the MAC 'W'.

The joint encoder module 406 can encode based on a construction length, a frame length, or a combination thereof. The construction length, as included in the message construction mechanism 134, can be represented as '$L=2^l$'. The construction length can be a length of the building block. The frame length can be represented as '$N=2^n$'. The frame length can be greater than or equal to the construction length. The joint encoder module 406 can encode using n–l levels of polarization on top of the building block with length 'L'.

The joint encoder module 406 can generate multiple instances of the encoded messages using the message polarization mechanism 136 based on the coordination profile 140 for coordinating multiple separate and concurrent communications. The joint encoder module 406 can generate the multiple instances of the encoded messages using one or same instance or value of the message polarization mechanism 136 for the separate and coordinated transmitting devices for coordinating the communications. The joint encoder module 406 can coordinate to encode the first message 118 and the second message 120, along with any other messages, as a singular unit of message with one or same instance or value of the message polarization mechanism 136.

The joint encoder module 406 can generate the first encoded message 130, the second encoded message 132, any other encoded message, or a combination thereof with the message polarization mechanism 136. The joint encoder module 406 can generate the first encoded message 130, the second encoded message 132, any other encoded message, or a combination thereof for coordinating the first encoded message 130, the second encoded message 132, any other encoded message, or a combination thereof generated with the message polarization mechanism 136.

For example, the joint encoder module 406 can generate the first encoded message 130 and the second encoded message 132, along with any other additional messages, by applying the same instance or value of the message polarization mechanism 136 to the first message 118 and the second message 120, along with any other messages, respectively. The first encoded message 130 and the second encoded message 132, along with any other encoded messages, can be constructed jointly by treating the whole polar transformation on all 'm' users as a single polar transformation with the same instance or value of the message polarization mechanism 136 and by regarding the MAC operation as one more level of polarization.

The joint encoder module 406 can generate the first encoded message 130 for communicating the first encoded message 130 concurrently with the second encoded message 132 or with any other additional messages. For example, the joint encoder module 406 can generate the first encoded message 130 using the message polarization mechanism 136 based on the coordination profile 140 for coordinating the first encoded message 130 and the second encoded message 132, and any other additional messages, for concurrent transmission through the second transmitter device 108 or any other additional transmitters.

It has been discovered that the first encoded message 130 coordinated with the second encoded message 132 based on communicating the coordination profile 140 between transmitters and encoded with the message polarization mechanism 136 provides increased communication rates. The coordinated messages utilizing comprehensive polarization for combination of separate transmission can achieve the entire uniform-rate region, such as for the uniform rate region 144, of m-user MAC. The coordination and singular polarization can reduce interference between signals and increase communication rates.

It has been discovered that the first encoded message 130 coordinated with the second encoded message 132 with the single instance or value of the message polarization mechanism 136 provides transmissions to achieve increased overall efficiency in communication. The coordinated messages utilizing comprehensive polarization for combination of separate transmission can achieve the entire uniform-rate region of m-user MAC. The coordination profile 140 identifying the uniform rate region 144 and the message construction mechanism 134 based on the coordination profile 140 can allow for multiplexing of multiple messages applicable to the single instance or value of the message polarization mechanism 136. The coordination and multiplexing with the single instance or value of the message polarization mechanism 136 can be used to utilize the best-available conditions or resources for multiple users, thereby increasing the overall efficiency.

The joint encoder module 406 can generate the encoded messages, including the first encoded message 130, the second encoded message 132, or a combination thereof, using the first communication unit 216, the second communication unit 236, the third communication unit 316, the fourth communication unit 336, the first control unit 212, the second control unit 234, the third control unit 312, the fourth control unit 334, or a combination thereof. The joint encoder module 406 can store the encoded messages in the first communication unit 216, the second communication unit 236, the third communication unit 316, the fourth communication unit 336, the first storage unit 214, the second storage unit 246, the third storage unit 314, the fourth storage unit 446, or a combination thereof.

After encoding the messages intended for transmission, the control flow can be passed from the joint encoder module 406 to the transmission module 408. The control flow can pass similarly as described above between the construction module 402 and the coordination module 404, but using processing results of the joint encoder module 406, such as the encoded messages including the first encoded message 130, the second encoded message 132, or a combination thereof.

The transmission module 408 is configured to transmit information for communicating between devices. The transmission module 408 can transmit the encoded information. The transmission module 408 can transmit the information using the network 110, the first inter-device interface 217, the second inter-device interface 237, the third inter-device interface 317, the fourth inter-device interface 337, the corresponding instance of the communication channel, or a combination thereof.

The transmission module 408 can transmit information utilizing one or more instance of the polarized MAC channels for the communication channel based on the encoded messages based on the message polarization mechanism 136. For example, the transmission module 408 can transmit information for the polarized MAC channels using the first encoded message 130, the second encoded message 132, any other encoded messages, or a combination thereof based on the common instance of the message polarization mechanism 136.

The transmission module 408 can transmit the information using a good bit-channel 416, a further good-channel 418, or a combination thereof. The good bit-channel 416 can include a representation of influences and processes between an intended bit and a detected result exceeding a condition. The good bit-channel 416 can be a specific instance of a bit channel representing the influences and the processes based on a bit, or the symbol grouping multiple instances of bits for transmission, with each symbol experiencing different effects of the communication channel, processing each bit or each of the grouped bits in the detected symbol differently, or a combination thereof.

The bit channel can represent the influences and the processes between a bit in the first content data 122, the second content data 126, or a combination thereof associated with a transmitting device and a corresponding value in a decoding result representing an estimation of the first content data 122, the second content data 126, or a combination thereof associated with a receiving device. The bit channel can be specifically associated with, such as resulting from a usage of, a polar coding scheme, as implemented with the message polarization mechanism 136.

The good bit-channel 416 can be based on an instance of the bit channel exceeding or satisfying a threshold predetermined by the computing system 100, a standard, or a combination thereof. The good bit-channel 416 can be an instance of the bit channel including a characteristic of better quality than others within a given or available set.

The further good-channel 418 can include a different instance of the bit channel exceeding or satisfying a threshold predetermined by the computing system 100, a standard, or a combination thereof. The further good-channel 418 can include an equivalent instance or a next-best instance of the bit channel than others within the given or available set.

It has been discovered that the first encoded message 130 based on the message construction mechanism 134 and the message polarization mechanism 136 coordinated with the second encoded message 132 provides reduced error rates and increased throughput for communication. The coordination with the message construction mechanism 134 and the message polarization mechanism 136 can effectively optimize communication by communicating the content data, such as the first content data 122, the second content data 126, or a combination thereof, through optimal channel, such as the good bit-channel 416, the further good-channel 418, or a combination thereof.

The computing system 100 can use the construction process, the polarization process, or a combination thereof for utilizing the good bit-channel 416, the further good-channel 418, or a combination thereof. For example, the computing system 100 can generate the first encoded message 130, the second encoded message 132, or a combination thereof for communicating the first encoded message 130, the second encoded message 132, or a combination thereof with the first content data 122, the second content data 126, or a combination thereof communicated through the good bit-channel 416, the further good-channel 418, or a combination thereof.

Along with the polarization of the MAC channel, the computing system 100 can utilize the good bit-channel 416, the further good-channel 418, or a combination thereof for communicating the first content data 122, the second content data 126, or a combination thereof based on the application or usage of the message polarization mechanism 136, the message construction mechanism 134, the coordination, or a combination thereof. The computing system 100 can further communicate the first format data 124, the second format data 128, or combination thereof over other instances of the bit channel.

It has been discovered that the first message 118 including the first format data 124 with frozen zero bits based on the content configuration 138 according to the message construction mechanism 134 coordinated with the second message 120 and the second format data 128 therein provides increase in overall multiplexing capacity and increased communication rates. The content configuration 138 and the message construction mechanism 134 can increase the length of the building block for multiplexing multiple different content. The computing system 100 can utilize increased options of decoding orders that can improve the overall efficiency of multiple communications.

The receiver module 410 is configured to communicate communication signals. The receiver module 410 can communicate signals by receiving signals, detecting signals, or a combination thereof. For example, the receiver module 410 can communicate the first receiver signal 152 of FIG. 1, the second receiver signal 154 of FIG. 1, or a combination thereof. Also for example, the receiver module 410 can receive the first receiver signal 152, the second receiver signal 154, or a combination thereof with the first receiver device 102, the second receiver device 104, the third device 162, or a combination thereof.

The receiver module 410 can receive the first receiver signal 152 representing the first encoded message 130 including the first content data 122, communicate the second receiver signal 154 representing the second encoded message 132 including the second content data 126, or a combination thereof. The receiver module 410 can receive the first receiver signal 152 and the second receiver signal 154, along with any other signals, coordinated for concurrently transmission.

The receiver module 410 can receive by recording electrical power, voltage, current, or a combination thereof. For example, the receiver module 410 can receive the first receiver signal 152, the second receiver signal 154, any other receiver signal, or a combination thereof by recording energy levels or changes therein for the first inter-device interface 217, the second inter-device interface 237, the third inter-device interface 317, the fourth inter-device interface 337, the first communication interface 228 of FIG. 2, the second communication interface 250 of FIG. 2, the third communication interface 328 of FIG. 3, the fourth communication interface 350 of FIG. 3, the first control interface 222, the second control interface 244, the third control interface 322, the fourth control interface 344, or a combination thereof.

As a more specific example, the receiver module 410 can receive the signals by recording energy levels or changes received through a wireless antenna, a wire or a conductor, an instruction or a step for transferring data between devices, processes, instructions, between portions therein, or a combination thereof. Also as a more specific example, the receiver module 410 can record the signals by storing the energy levels or changes therein, according to a time, a sequence, or a combination thereof in the first communication unit 216, the second communication unit 236, the third communication unit 316, the fourth communication unit 336, the first storage unit 214, the second storage unit 246, the third storage unit 314, the fourth storage unit 346, or a combination thereof.

The receiver module 410 can process the received signals to determine aspects thereof. For example, the receiver module 410 can determine the message size 150 of FIG. 1, a sample index, interference, noise, or a combination thereof. The receiver module 410 can determine aspects of the first receiver signal 152, the second receiver signal 154, any additional signal, or a combination thereof based on a method or a process predetermined by the computing system 100 or a standard for controlling or determining the message size 150, a block size, a symbol size, or a combination thereof.

The receiver module 410 can further use a dedicated device, circuitry, process, or a combination thereof to determine the aspects of the received signal including the message size 150, the noise, the interference, or a combination thereof. The receiver module 410 can also use known parts or aspects of the received signals to further identify appropriate instance of the values for other aspects as predetermined and stored by the computing system 100. The receiver module 410 can further determine the noise measure using a statistical analysis based on the noise portion, based on values predetermined by the computing system 100, or a combination thereof.

The receiver module 410 can further characterize the communication channels. The receiver module 410 can calculate the channel characterization 156.

The receiver module 410 can use the reference portion associated with the receiver signals or a portion in the receiver signals corresponding thereto, or a combination thereof to calculate the channel characterization 156. The details, formats, requirements, or a combination thereof regarding the reference portion, such as regarding original frequency, phase, content, shape, or a combination thereof, can be predetermined by the communication standard, the computing system 100, or a combination thereof.

The receiver module 410 can compare the received instances of the received signals or segments therein to the predetermined parameters for the reference portion. The receiver module 410 can further use frequency domain transformation or time domain transformation, convolution, transposition, basic mathematical operations, or a combination thereof with the predetermined or received instances of the reference communication, or both.

The receiver module 410 can further calculate the changes in magnitude, frequency, phase, or a combination thereof in the reference portion in the encoded signals, or a combination thereof to the received signals. The receiver module 410 can further use various methods, such as the least square method, the least mean square (LMS) method, or the minimum mean square error (MMSE) method, to calculate the channel characterization 156.

The receiver module 410 can further detect the received signals. The receiver module 410 can detect by recognizing contents for the first receiver signal 152, the second receiver signal 154, any additional signals, or a combination thereof. For example, the receiver module 410 can utilize maximum likelihood detector, a linear estimator, such as a minimum mean square error estimator or a zero-forcing estimator, or an interference cancelling detector. Also for example, the receiver module 410 can recognize symbols using hard decision or soft decisions, such as based on likelihood values according to a detection mechanism predetermined or known for the computing system 100 or based on a standard.

The receiver module 410 can determine the aspects of the received signals, calculate the channel characterization 156, detect signals, or a combination thereof using the first communication unit 216, the second communication unit 236, the third communication 316, the fourth communication 336, the first control unit 212, the second control unit 234, the third control unit 312, the second control unit 334, or a combination thereof. The receiver module 410 can store the aspects of the received signals, the channel characterization 156, or a combination thereof in the first communication unit 216, the second communication unit 236, the third communication 316, the fourth communication 336, the first storage unit 214, the second storage unit 246, the third storage unit 314, the fourth storage unit 346, or a combination thereof.

After receiving and processing the signals, the control flow can be passed from the receiver module 410 to the sequence module 412, the decoder module 414, or a combination thereof. The sequence module 412 and the decoder module 414 can be implemented iteratively or in series exchanging control flow there-between, implemented in parallel, or a combination thereof. The control flow can pass similarly as described above between the construction module 402 and the coordination module 404, but using processing results of the receiver module 410, such as the first receiver signal 152, the second receiver signal 154, the channel characterization 156, or a combination thereof.

The sequence module 412 is configured to control the decoding process. The sequence module 412 can control the decoding process based on the communication rate, such as the first rate 158, the second rate 160, or a combination thereof.

The sequence module 412 can determine the communication rate associated with the received signal. For example, the sequence module 412 can determine the first rate 158 associated with the first receiver signal 152, the second rate 160 associated with the second receiver signal 154, or a combination thereof.

The sequence module 412 can determine the communication rate based on:

$$R_i^{(1)} = \frac{\sum_{j=1}^{L+i-1} I_{j,i}}{L} \quad R_i^{(2)} = \frac{\sum_{j=1}^{i-1} I_{j,i} + \sum_{j=L+i}^{2L} I_{j,i}}{L}. \quad \text{Equation (1)}$$

The terms '$(R_i^{(1)}, R_i^{(2)})$' can represent the first rate 158 and the second rate 160, respectively, located on the dominant face of the capacity region represented by the uniform rate region 144. The term '$i=1, 2, \ldots, L$' can represent an index up to '$L=2^l$' representing the construction length, such as for the content data, the format data, the message, or a combination thereof, as included in the message construction mechanism 134.

The sequence module 412 can determine the communication rate based on mutual information 420, represented as '$I_{j,i}$'. The mutual information 420 is a measure of mutual dependence between parameters. The mutual information 420 can be the measure of mutual dependence between processing results associated with the first encoded message 130, the second encoded message 132, the first message 118, the second message 120, the first content data 122, the second content data 126, any additional message, a portion or a segment therein, or a combination thereof.

The sequence module 412 can calculate the mutual information 420 based on the first receiver signal 152, the second receiver signal 154, any additional received signal, or a combination thereof. The sequence module 412 can calculate the mutual information 420 for representing the message construction mechanism 134 associated with the coordination profile 140 for the receiving device. The sequence module 412 can calculate the mutual information 420 for determining the effect of the message construction mechanism 134 and the coordination profile 140 at the receiving device.

The sequence module 412 can calculate the mutual information 420 based on a mutual designation mechanism 422. The mutual designation mechanism 422 is a process or a method for calculating the mutual information 420. The mutual designation mechanism 422 can include a table, an equation, or a combination thereof for calculating the mutual information 420 based on the first receiver signal 152, the second receiver signal 154, a portion therein, or a combination thereof.

As a specific example, the computing system 100 can process the first receiver signal 152, the second receiver signal 154, or a combination thereof based on the content configuration 138 of '$P^{(i)}=(V_1^{i-1},U_1^N,V_i^N)$'. The sequence module 412 can calculate the mutual information 420 based on:

$$I(U_1^L,V_1^L;Y_1^L)=\Sigma_{j=1}^{i-1}I(V_j;Y_1^L,V_1^{j-1})+\Sigma_{j=1}^{L}I(U_j;Y_1^L,V_1^{i-1},U_1^{j-1})+\Sigma_{j=i}^{L}I(V_j;Y_1^L,V_1^{j-1},U_1^L).$$
Equation (2).

The term '$I(U_1^L,V_1^L;Y_1^L)$' can represent the mutual information 420. Equation (2) can be a representation of the mutual information 420 expanded using the chain rule.

Continuing with the example, the sequence module 412 can include the mutual designation mechanism 422 for calculating the mutual information 420, represented as '$I_{j,i}$', denoting the j-th term in Equation (2) for 'j=1, 2, . . . , L'. The mutual designation mechanism 422 can be represented as:

$$I_{j,i} = \begin{cases} I(V_j; Y_1^L, V_1^{j-1}) & \text{if } j \le i-1 \\ I(U_{j-i+1}; Y_1^L, V_1^{i-1}, U_1^{j-1}) & \text{if } i \le j \le L+i-1. \\ I(V_{j-L}; Y_1^L, V_1^{j-L-1}, U_1^L) & \text{if } L+i \le j \le 2L. \end{cases}$$
Equation (2)

Continuing with the example, the sequence module 412 can generate a decoding sequence 424 based on the communication rate including the mutual information 420. The decoding sequence 424 is an order or an arrangement for the decoding process for decoding for the first encoded message 130, the second encoded message 132, the first message 118, the second message 120, the first content data 122, the second content data 126, a portion or a segment thereof, or a combination thereof. The sequence module 412 can generate the decoding sequence 424 for controlling the decoding process for decoding the received signals according to the message construction mechanism 134 associated with the coordination profile 140.

Continuing with the example, the sequence module 412 can generate the decoding sequence 424 according to:

$$D_1^{2N} = \left(V_1^{\frac{N(i-1)}{L}}, U_1^N, V_{\frac{N(i-1)}{L}+1}^N\right).$$
Equation (4)

The term '$D_1^{2N}$' can represent the decoding sequence 424.

The sequence module 412 can generate the decoding sequence 424 based on a table or a list predetermined by the computing system 100. The sequence module 412 can generate the decoding sequence 424 based on the communication rate, including the first rate 158, the second rate 160, any additional rates, or a combination thereof, the mutual information 420, the mutual designation mechanism 422, or a combination thereof.

It has been discovered that the decoding sequence 424 based on the communication rate and representing the message construction mechanism 134 associated with the coordination profile 140 provides reduced complexity. The decoding sequence 424 can control and estimate the construction for the transmitter message and enable bit-by-bit decoding with the decoder module 414.

The sequence module 412 can use the first communication unit 216, the second communication unit 236, the third communication unit 316, the fourth communication unit 336, the first control unit 212, the second control unit 234, the third control unit 312, the fourth control unit 334, or a combination thereof to generate the decoding sequence 424. The sequence module 412 can store the decoding sequence 424 in the first communication unit 216, the second communication unit 236, the third communication unit 316, the fourth communication unit 336, the first storage unit 214, the second storage unit 246, the third storage unit 314, the fourth storage unit 446, or a combination thereof.

After generating the decoding sequence 424, the control flow can be passed from the sequence module 412 to the decoder module 414. The control flow can pass similarly as described above between the construction module 402 and the coordination module 404, but using processing results of the sequence module 412, such as the decoding sequence 424.

The decoder module 414 is configured to decode the received signals. The decoder module 414 can decode by recognizing and verifying the intended information. For example, the decoder module 414 can decode by recognizing and verifying for the first content data 122, the second format data 128, any additional intended content, or a combination thereof from the first receiver signal 152, the second receiver signal 154, any additional received signal, processing results thereof, or a combination thereof. As a more specific example, the decoder module 414 can recognize and verify specific value for the bits of the first content data 122, the second format data 128, any additional intended content, or a combination thereof.

The decoder module 414 can include a successive cancellation decoder 426. The decoder module 414 can utilize the successive cancellation decoder 426 specific for the polar coding scheme. The successive cancellation decoder 426 can include successive cancellation list decoder or successive cancellation stack decoder.

The decoder module 414 can use the successive cancellation decoder 426 to iteratively decode, remove, or a combination thereof for different portions of the received signal. The decoder module 414 can further use the successive cancellation decoder 426 to decode for the first content data 122, the second content data 126, any additional content, or a combination thereof.

The decoder module 414 can decode the received signal, such as the first receiver signal 152, the second receiver signal 154, any additional received signal, or a combination thereof according to the decoding sequence 424. The decoder module 414 can decode the received signal based on the mutual information 420, the communication rate, the message polarization mechanism 136, the message construction mechanism 134, the coordination profile 140, or a combination thereof as represented by the decoding sequence 424.

The decoder module 414 can decode the received signals identifying the first encoded message 130, the second encoded message 132, the content data therein, or a combination thereof intended for communication based on the coordination profile 140 corresponding to the communication rate, as represented by the decoding sequence 424. The decoder module 414 can decode the first receiver signal 152, the second receiver signal 154, or a combination thereof to identify portions corresponding to the first encoded message 130, the second encoded message 132, or a combination thereof and further estimate or recover the first content data 122, the second content data 126, or a combination thereof.

The decoder module 414 can decode for a sequence of specific targets based on the decoding sequence 424. For example, the decoder module 414 can decode the received signal using the successive cancellation decoder 426 operating according to the decoding sequence 424. Also for example, the decoder module 414 can decode for one of the first message 118, the second message 120, any other transmitter message, a portion or a segment therein, or a combination thereof for each iteration or session over multiple iterations or sessions according to the decoding sequence 424.

The decoder module 414 can decode the receiver signals by calculating a decoding result 428. The decoding result 428 can be a processing output for representing an estimate for the intended content from processing the received signals. For example, the decoding result 428 can include an estimate for the first content data 122, the second content data 126, any additional communication information, or a combination thereof from the first receiver signal 152, the second receiver signal 154, any additional received signal, or a combination thereof.

As a more specific example, the decoding result 428 can include a first likelihood set, a second likelihood set, or a combination thereof specific to building block of length 4, specific to two independent communications, or a combination thereof. The first likelihood set can correspond to likelihood values for the first receiver signal 152. The second likelihood set can correspond to likelihood values for the second receiver signal 154.

Continuing with the example, the first receiver signal 152 can correspond to a first portion or bit of the first message 118, represented as '$U_1$', the second message 120, represented as '$V_1$', or a combination thereof. The second receiver signal 154 can further correspond to a second or a latter portion or bit of the first message 118, represented as '$U_2$', the second message 120, represented as '$V_2$', or a combination thereof. The decoder module 414 can calculate likelihood values, ratios, logarithmic derivations thereof, or a combination thereof.

The decoder module 414 can calculate the separate likelihood sets based on identifying independent and separate communications. The computing system 100 can identify the separate and independent communications in the received signals based on the reference portion, as described and utilized by the receiver module 410.

Continuing with the example, the decoder module 414 can calculate multiple values for each sets corresponding to each of the independent and separate communications. The decoder module 414 can calculate a first-set first-value, a first-set second-value, a second-set first-value, a second-set second-value, or a combination thereof. The decoder module 414 can calculate logarithmic likelihood ratio as the first-set first-value, the first-set second-value, the second-set first-value, the second-set second-value, or a combination thereof.

Continuing with the example, the decoder module 414 can calculate the first-set first-value based on:

$$L_1 = \frac{e^{-\frac{y_1^2}{\sigma^2}} + e^{-\frac{(y_1+2)^2}{\sigma^2}}}{e^{-\frac{y_1^2}{\sigma^2}} + e^{-\frac{(y_1-2)^2}{\sigma^2}}}. \qquad \text{Equation (5)}$$

The first-set first-value can be represented as '$L_1$'. The first receiver signal 152 can be represented as '$y_1$'. The term '$\sigma^2$' can represent a power, a spread, a deviation, or a combination thereof associated with the noise portion of the received signal. The first-set first-value can correspond to the first portion of the first message 118.

Continuing with the example, the decoder module 414 can calculate the first-set second-value based on:

$$L_2 = e^{\frac{(y_1 - 2(u_1 \oplus u_2))^2 - (y_1 - 2(u_1 \oplus u_2)+2)^2}{\sigma^2}}. \qquad \text{Equation (6)}$$

The operator '$\oplus$' can represent an XOR operation. The terms '$u_1$' and '$u_2$' can represent different portions of the first encoded message 130 or the first content data 122 therein, the bits corresponding thereto, or a combination thereof. The first-set second-value can correspond to the first portion of the second message 120.

Continuing with the example, the decoder module 414 can similarly calculate the second-set first-value based on:

$$L_3 = \frac{e^{-\frac{y_2^2}{\sigma^2}} + e^{-\frac{(y_2+2)^2}{\sigma^2}}}{e^{-\frac{y_2^2}{\sigma^2}} + e^{-\frac{(y_2-2)^2}{\sigma^2}}}. \qquad \text{Equation (7)}$$

The term '$y_2$' can represent the second receiver signal 154. The second-set first-value can correspond to the second portion of the first message 118, the second message 120, or a combination thereof.

Continuing with the example, the decoder module 414 can similarly calculate the second-set second-value based on:

$$L_4 = e^{\frac{(y_2 - 2u_2)^2 - (y_2 - 2u_2 + 2)^2}{\sigma^2}}. \qquad \text{Equation (8)}$$

The second-set second-value can correspond to the second portion of the first message 118, the second message 120, or a combination thereof.

The decoder module 414 can further process the decoding result 428 based on:

$$\frac{P(y_1^2 \mid u_1 = 0)}{P(y_1^2 \mid u_1 = 1)} = \frac{1 + L_1 L_3}{L_1 + L_3}. \qquad \text{Equation (9)}$$

$$\frac{P(y_1^2, u_1^2, v_1 \mid v_2 = 0)}{P(y_1^2, u_1^2, v_1 \mid v_2 = 1)} = L_2^{1-2v_1} L_4. \qquad \text{Equation (10)}$$

The decoder module 414 can process the decoding result 428 according to different portions of the intended message, such as for the first message 118, the second message 120, additional intended message, or a combination thereof. For example, the decoder module 414 can process the decoding result 428 according to the first content data 122, the first format data 124, the second content data 126, the second format data 128, other additional content and format data, or a combination thereof.

The decoder module 414 can further decode the received signal based on a channel polarization mechanism 430 and the channel characterization 156. The channel polarization mechanism 430 is a process or a method for regarding the MAC operation as one additional level of polarization. The channel polarization mechanism 430 can include an equation, a threshold, a list or a table, or a combination thereof predetermined by the computing system 100 for processing the MAC operation as one additional level of polarization.

The decoder module 414 can decode the first receiver signal 152, the second receiver signal 154, or a combination thereof based on the channel polarization mechanism 430 and the channel characterization 156 or effects from the communication channel. The decoder module 414 can use the channel polarization mechanism 430 to remove the channel characterization 156 based on reversing or applying an additional process for a polarization similar to the joint encoder module 406 as described above.

It has been discovered that the channel polarization mechanism 430 or regarding the MAC operation as one additional level of polarization provides reduced complexity. The channel polarization mechanism 430 can enable the receiver to implement the successive cancellation decoder 426 to perform bit-by-bit decoding process.

Referring now to FIG. 5, therein is shown a flow chart 500 of a method of operation of a computing system in a further embodiment of the present invention. The method 500 includes: communicating a coordination profile based on a coordination mechanism for coordinating a second transmitter device with a first transmitter device communicating the content configuration in a block 502; and generating a first encoded message with a communication unit using a message polarization mechanism based on the coordination profile for coordinating the first encoded message with a second encoded message for concurrent transmission through the second transmitter device in a block 504.

Further regarding FIG. 5, therein is shown a further flow chart 550 of a further method of operation of a computing system in a further embodiment of the present invention. The method 550 includes: receiving a receiver signal for representing a first encoded message and a second encoded message coordinated for concurrently transmitting with the first encoded message in a block 552; determining a communication rate associated with the receiver signal in a block 554; and decoding the receiver signal with a communication unit based on a message polarization mechanism and the communication rate for identifying the first encoded message intended for communication based on a coordination profile corresponding to the communication rate in a block 556.

The modules described in this application can be hardware implementation or hardware accelerators, including passive circuitry, active circuitry, or both, in the first communication unit 216 of FIG. 2, the second communication unit 236 of FIG. 2, the third communication unit 316 of FIG. 3, the fourth communication unit 336 of FIG. 3, the first control unit 212 of FIG. 2, the second control unit 238 of FIG. 2, the third control unit 312 of FIG. 3, the fourth control unit 338 of FIG. 3, or a combination thereof. The modules can also be hardware implementation or hardware accelerators, including passive circuitry, active circuitry, or both, within the first receiver device 102 of FIG. 1, the second receiver device 104 of FIG. 1, the first transmitter device 106 of FIG. 1, the second transmitter device 108 of FIG. 1, the third device 162 of FIG. 1, or a combination thereof but outside of the first communication unit 216, the second communication unit 236, the third communication unit 316, the fourth communication unit 336, the first control unit 212, the second control unit 234, the third control unit 312, the fourth control unit 338, or a combination thereof.

The computing system 100 of FIG. 1 has been described with module functions or order as an example. The computing system 100 can partition the modules differently or order the modules differently. For example, the construction module 402 of FIG. 4 and the coordination module 404 of FIG. 4 can be combined into one module, the decoder module 414 of FIG. 4 and the sequence module 412 of FIG. 4 can be combined into one module, or a combination thereof. Also for example, the receiver module 410 can be implemented as separate modules each for receiving the signal, detecting the signal, processing the communication channel, or a combination thereof.

For illustrative purposes, the various modules have been described as being specific to the first receiver device 102, the first transmitter device 106, or a combination thereof. However, it is understood that the modules can be distributed differently. For example, the various modules can be implemented in a different device, or the functionalities of the modules can be distributed across multiple devices. As a more specific example, the construction module 402, the coordination module 404, the joint encoder module 406 of FIG. 4, or a combination thereof can be included in each of the devices 102-108 and 160, spread out and shared across the devices, or implemented in one or few of the devices coordinating for the group of devices.

Also as an example, the various modules can be stored in a non-transitory memory medium. As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit, such as a chip or a processor, or across multiple hardware units.

The modules described in this application can be stored in the non-transitory computer readable medium. The first communication unit 216, the second communication unit 236, the third communication unit 316, the first control unit 212, the second control unit 234, the first control unit 212, the second control unit 234, the third control unit 312, the fourth control unit 338, the first storage unit 214 of FIG. 2, the second storage unit 246 of FIG. 2, the third storage unit 314 of FIG. 3, the fourth storage unit 346 of FIG. 3, or a combination thereof can represent the non-transitory computer readable medium. The first communication unit 216, the second communication unit 236, the third communication unit 316, the first control unit 212, the second control unit 234, the first control unit 212, the second control unit 234, the third control unit 312, the fourth control unit 338, the first storage unit 214, the second storage unit 246, the third storage unit 314, the fourth storage unit 346, or a combination thereof, or a portion therein can be removable from the first receiver device 102, the second receiver device 104, the first transmitter device 106, the second receiver device 104, the third device 162, or a combination thereof. Examples of the non-transitory computer readable medium can be a non-volatile memory card or stick, an external hard disk drive, a tape cassette, or an optical disk.

The physical transformation of the content data to the encoded message based on the message construction mechanism 134 of FIG. 1 and the coordination profile 140 of FIG. 1 results in the movement in the physical world, such as content displayed or recreated for the user on the receiving from processing the coordinated components of the received signal corresponding to the encoded message. The reproduced content data, such as navigation information or voice signal of a caller, can influence the user's movement, such as following the navigation information or replying back to the caller. Movement in the physical world results in changes to the channel characterization, the geographic location of the receiving device, or a combination thereof, which can be fed back into the computing system 100 and influence the coordination profile 140 and the message construction mechanism 134.

The physical transformation of the received signal from utilizing the decoding sequence 424 of FIG. 4 for the decoding process results in the movement in the physical world, such as content displayed or recreated for the user on the first user device from processing the serving content therein. The content reproduced on the receiving device, such as navigation information or voice signal of a caller, can influence the user's movement, such as following the navigation information or replying back to the caller. Movement in the physical world results in changes to the channel estimates, the geographic location of the receiving device, or a combination thereof, which can be fed back into the computing system 100 and influence the decoding sequence 424.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
    an inter-device interface configured to communicate a coordination profile based on a coordination mechanism, wherein the coordination mechanism coordinates a second transmitter device with a first transmitter device; and
    a communication unit, coupled to the inter-device interface, configured to generate a first encoded message using a message polarization mechanism,
        wherein the coordination profile coordinates the first encoded message with a second encoded message for processing the first encoded message and the second encoded message using a single polar transformation across the first transmitter device and the second transmitter device and by regarding multiple access channel (MAC) operation as one more level of polarization, and
        wherein the second encoded message is for transmission through the second transmitter device concurrent with transmission of the first encoded message with the first transmitter device.

2. The system as claimed in claim 1 wherein the communication unit is configured to:
    construct a first message according to a message construction mechanism based on the coordination profile for coordinating the first message with a second message using the coordination profile; and
    generate the first encoded message based on the first message for communicating the first encoded message concurrently with the second encoded message based on the second message.

3. The system as claimed in claim 1 wherein the communication unit is configured to:
    determine a channel characterization corresponding to the first encoded message; and
    calculate the coordination profile based on the channel characterization for communicating the coordination profile between the first transmitter device and the second transmitter device.

4. The system as claimed in claim 1 wherein: the communication unit is configured to:
    construct a first message including first content data and first format data for coordinating the first message with a second message including second content data and second format data; and
    generate the first encoded message based on the first message for communicating the first encoded message with the first content data communicated through a good bit-channel representing influences and processes on a bit communicated between a receiving device and the first transmitter device, the second transmitter device, or a combination thereof exceeding or satisfying a threshold or condition.

5. A computing system comprising:
    an inter-device interface configured to communicate a receiver signal for representing a first encoded message and a second encoded message coordinated based on a coordination mechanism,
        wherein the second encoded message is for transmitting through a second transmitter device concurrent with transmission of the first encoded message with a first transmitter device,
        wherein the coordination mechanism is for processing the second encoded message and the first encoded message using a single polar transformation across the first transmitter device and the second transmitter device and by regarding multiple access channel (MAC) operation as one more level of polarization;
    a communication unit, coupled to the inter-device interface, configured to:
        determine a communication rate associated with the receiver signal, and
        decode the receiver signal based on a message polarization mechanism and the communication rate for identifying the first encoded message intended for communication based on a coordination profile corresponding to the communication rate.

6. The system as claimed in claim 5 wherein the communication unit is configured to:
    generate a decoding sequence based on the communication rate for decoding the receiver signal according to a message construction mechanism associated with the coordination profile; and
    jointly decode the first encoded message and second encoded message from the receiver signal according to the decoding sequence.

7. The system as claimed in claim 5 wherein the communication unit is configured to decode the receiver signal based on a channel polarization mechanism and a channel characterization.

8. The system as claimed in claim 5 wherein the communication unit is configured to:

calculate mutual information based on the receiver signal, the mutual information for representing a message construction mechanism associated with the coordination profile; and decode the receiver signal based on the mutual information.

9. The system as claimed in claim 5 wherein the communication unit configured to decode the receiver signal using a successive cancellation decoder.

10. A method of operation of a computing system comprising:

communicating a coordination profile based on a coordination mechanism, wherein the coordination mechanism coordinates a second transmitter device with a first transmitter device; and generating a first encoded message with a communication unit using a message polarization mechanism, wherein the coordination profile coordinates the first encoded message with a second encoded message for processing the first encoded message and the second encoded message using a single polar transformation across the first transmitter device and the second transmitter device and by regarding multiple access channel (MAC) operation as one more level of polarization and wherein the second encoded message is for transmission through the second transmitter device concurrent with transmission of the first encoded message with the first transmitter device.

11. The method as claimed in claim 10 wherein generating the first encoded message includes:

constructing a first message according to a message construction mechanism based on the coordination profile for coordinating the first message with a second message using the coordination profile; and generating the first encoded message based on the first message for communicating the first encoded message concurrently with the second encoded message based on the second message.

12. The method as claimed in claim 10 further comprising:

determining a channel characterization corresponding to the first encoded message; and calculating the coordination profile based on the channel characterization for communicating the coordination profile between the first transmitter device and the second transmitter device.

13. The method as claimed in claim 10 further comprising:

constructing a first message including first content data and first format data for coordinating the first message with a second message including second content data and second format data; and wherein:

generating the first encoded message includes generating the first encoded message based on the first message for communicating the first encoded message with the first content data communicated through a good bit-channel representing influences and processes on a bit communicated between a receiving device and the first transmitter device the second transmitter device, or a combination thereof exceeding or satisfying a threshold or condition.

14. A method of operation of a computing system comprising:

receiving a receiver signal for representing a first encoded message and a second encoded message coordinated based on a coordination mechanism, wherein the second encoded message is for transmitting through a second transmitter device concurrent with transmission of the first encoded message with a first transmitter device, wherein the coordination mechanism is for processing the second encoded message and the with a first encoded message using a single polar transformation across the first transmitter device and the second transmitter device and by regarding multiple access channel (MAC) operation as one more level of polarization;

determining a communication rate associated with the receiver signal; and decoding the receiver signal with a communication unit based on a message polarization mechanism and the communication rate for identifying the first encoded message intended for communication based on a coordination profile corresponding to the communication rate.

15. The method as claimed in claim 14 further comprising:

generating a decoding sequence based on the communication rate for decoding the receiver signal according to a message construction mechanism associated with the coordination profile; and wherein:

decoding the receiver signal includes jointly decoding the first encoded message and second encoded message from the receiver signal according to the decoding sequence.

16. The method as claimed in claim 14 wherein decoding the receiver signal includes decoding the receiver signal based on a channel polarization mechanism and a channel characterization.

17. The method as claimed in claim 14 further comprising:

calculating mutual information based on the receiver signal, the mutual information for representing a message construction mechanism associated with the coordination profile; and wherein:

decoding the receiver signal includes decoding the receiver signal based on the mutual information.

18. The method as claimed in claim 14 wherein decoding the receiver signal includes decoding the receiver signal using a successive cancellation decoder.

* * * * *